US009859957B2

United States Patent
Shinohe et al.

(10) Patent No.: US 9,859,957 B2
(45) Date of Patent: Jan. 2, 2018

(54) ANTENNA MODULE FOR COMMUNICATION AND POWER TRANSMISSION

(71) Applicant: Sony Corporation, Tokyo (JP)

(72) Inventors: Yusuke Shinohe, Tokyo (JP); Fumitaka Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1029 days.

(21) Appl. No.: 14/062,356

(22) Filed: Oct. 24, 2013

(65) Prior Publication Data

US 2014/0125141 A1 May 8, 2014

(30) Foreign Application Priority Data

Nov. 7, 2012 (JP) .................. 2012-245276

(51) Int. Cl.
*H04B 5/00* (2006.01)
*H01Q 1/22* (2006.01)
*H01Q 7/00* (2006.01)

(52) U.S. Cl.
CPC ......... *H04B 5/0037* (2013.01); *H01Q 1/2266* (2013.01); *H01Q 7/00* (2013.01); *H04B 5/0087* (2013.01)

(58) Field of Classification Search
CPC .. H04B 5/0037; H04B 5/0087; H01Q 1/2266; H01Q 7/00
USPC .......................................................... 307/104
See application file for complete search history.

(56) References Cited

U.S. PATENT DOCUMENTS

| 2,169,975 | A * | 8/1939 | Gold ................... B32B 37/1284 118/106 |
| 6,320,508 | B1 * | 11/2001 | Giesler .............. G06K 19/0701 340/572.2 |
| 7,960,867 | B2 * | 6/2011 | Issa .......................... H01Q 7/00 307/104 |
| 2009/0001817 | A1 * | 1/2009 | Heisch .................... H01F 38/14 307/104 |
| 2010/0066619 | A1 * | 3/2010 | Furumura ............ B42D 25/369 343/742 |
| 2010/0148939 | A1 * | 6/2010 | Yamada .................... H01Q 7/00 340/10.34 |
| 2010/0225272 | A1 * | 9/2010 | Kirby ....................... H04B 5/00 320/108 |
| 2010/0277386 | A1 * | 11/2010 | Iliev ................. G06K 19/07749 343/788 |
| 2010/0311327 | A1 * | 12/2010 | Hamada .................. H02J 7/025 455/41.1 |
| 2011/0025264 | A1 * | 2/2011 | Mochida ............. H01M 10/425 320/108 |
| 2012/0122400 | A1 * | 5/2012 | Kitagawa ............. H04B 5/0031 455/41.2 |
| 2012/0139690 | A1 * | 6/2012 | Gupta ............... H04M 1/72569 340/5.1 |

(Continued)

FOREIGN PATENT DOCUMENTS

JP       2002033607 A * 1/2002
JP       2009-171070 A   7/2009

*Primary Examiner* — Jared Fureman
*Assistant Examiner* — Michael Warmflash
(74) *Attorney, Agent, or Firm* — Chip Law Group

(57) ABSTRACT

There is provided an antenna module including a non-contact power transmission coil, and a proximity radio communication antenna formed coaxially with the non-contact power transmission coil.

16 Claims, 15 Drawing Sheets

(56) References Cited

U.S. PATENT DOCUMENTS

2013/0009488 A1\* 1/2013 Choe ...................... H02J 5/005
                                                          307/104

\* cited by examiner

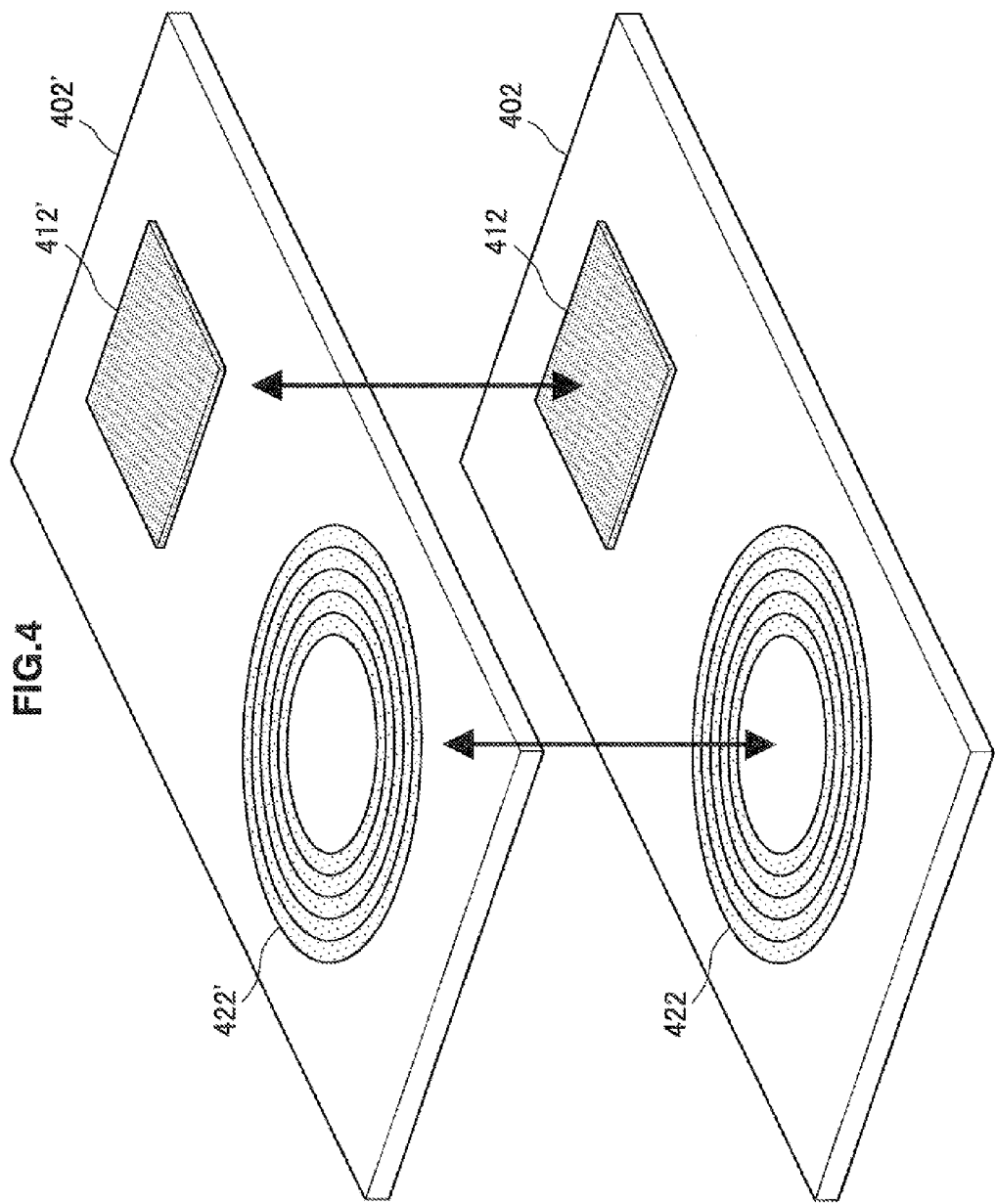

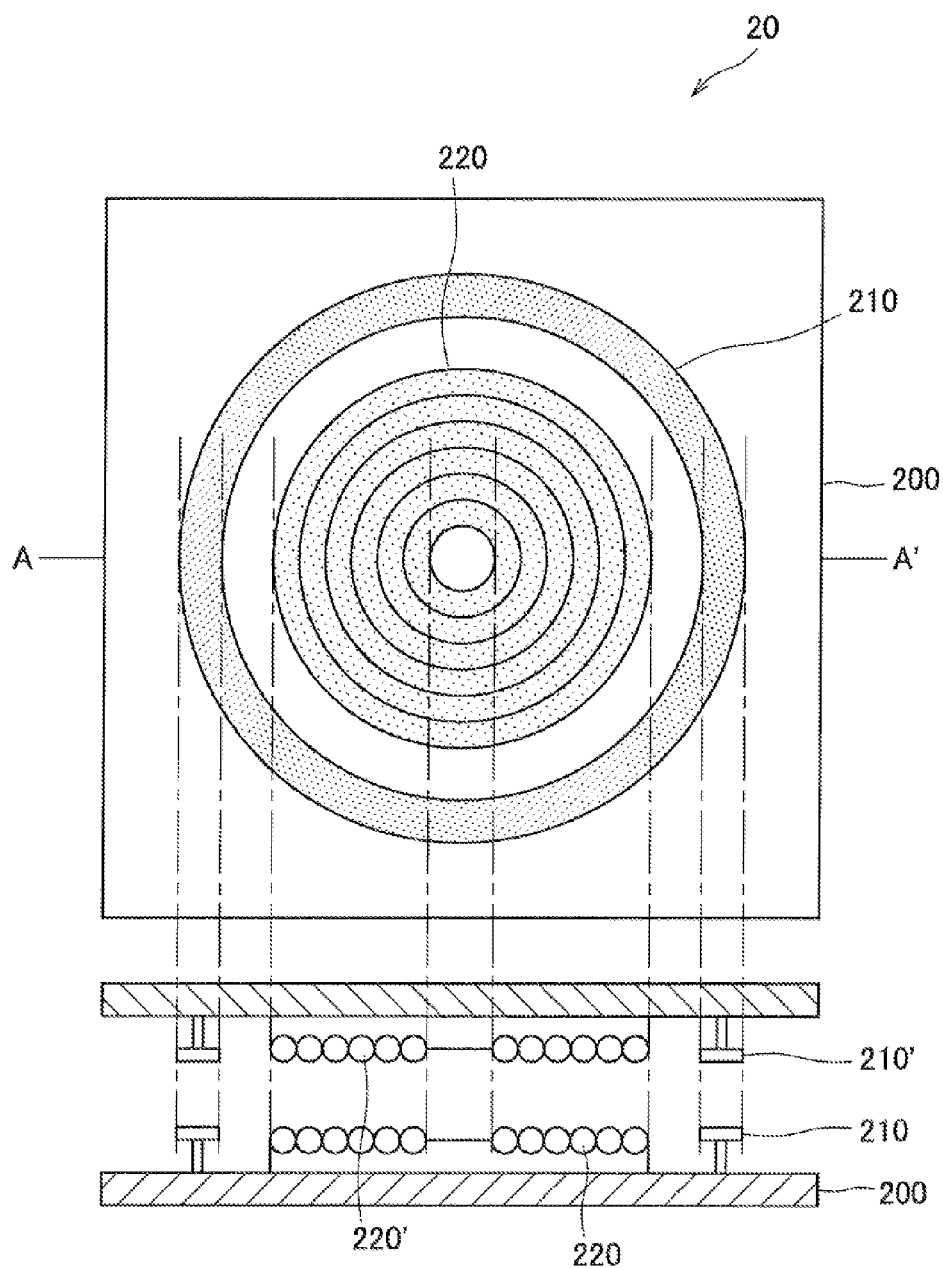

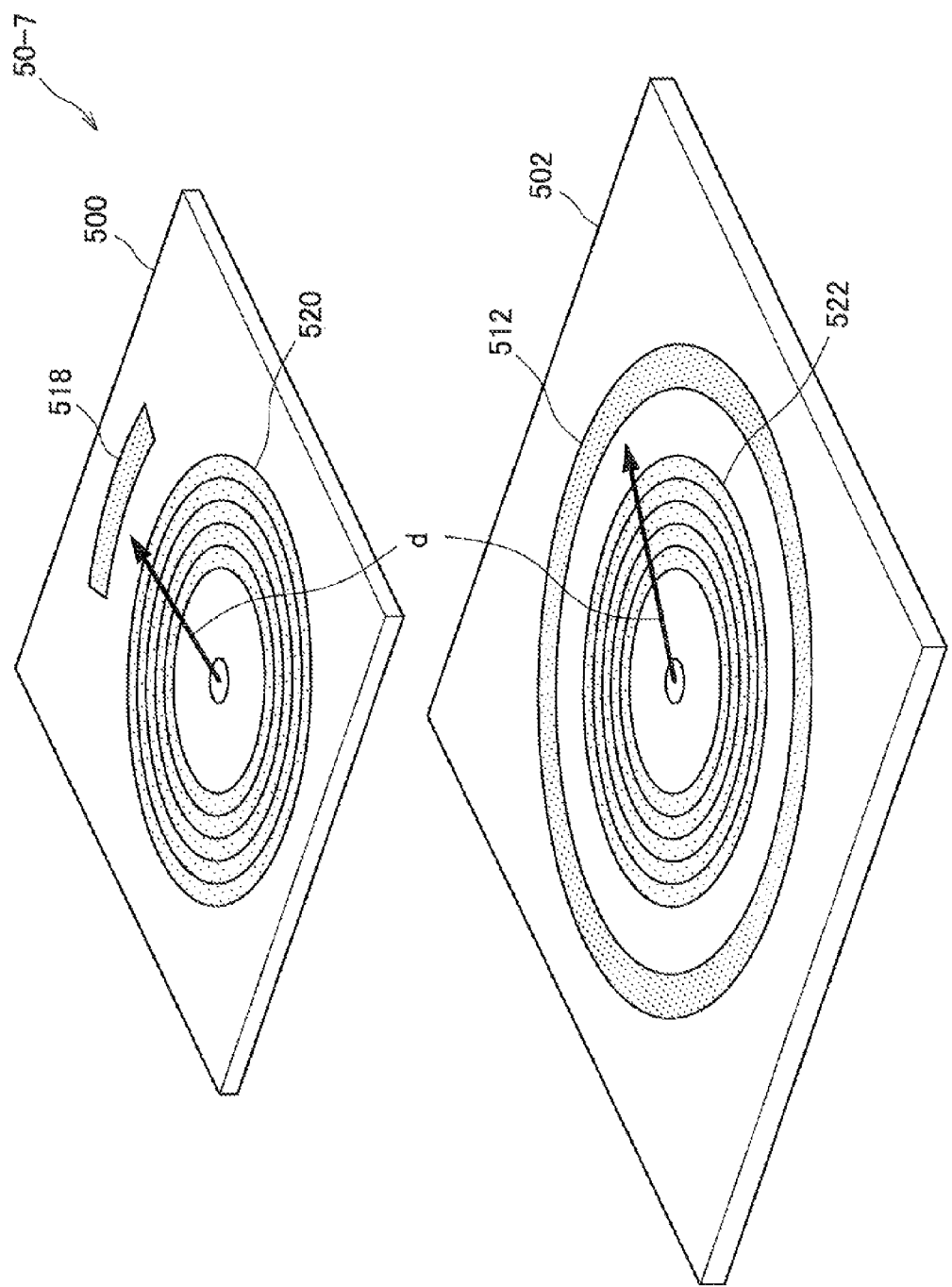

ANTENNA MODULE FOR COMMUNICATION AND POWER TRANSMISSION

CROSS REFERENCE TO RELATED APPLICATIONS

This application claims the benefit of Japanese Priority Patent Application JP 2012-245276 filed Nov. 7, 2012, the entire contents of which are incorporated herein by reference.

BACKGROUND

The present disclosure relates to an antenna module, an information communication device, and an information communication system.

In recent years, there are widely used non-contact IC cards and communication devices configured to perform non-contact proximity radio communication such as RFID (Radio Frequency IDentification). For example, methods using magnetic field coupling and electric field coupling are known as methods for the proximity radio communication, the magnetic field coupling using an alternating field caused by an antenna coil, the electric field coupling using a plate-shaped electrode as an antenna.

In addition, JP 2009-171070A describes incorporating a plurality of antennas and coils into one antenna module to enable transmission and reception using a plurality of communication systems.

SUMMARY

Meanwhile, there is also known non-contact power transmission in which not data communication but power transmission is performed in a non-contact manner. Generally, for the non-contact power transmission, a coil is provided in each of a power receiving device and a power transmitting device, and electromagnetic induction, magnetic field resonance, or the like, is utilized.

Further, there is known an electronic device, such as a communication device in which both the non-contact power transmission and the proximity radio communication can be performed by equipping the one communication device with a non-contact power transmission coil and a proximity radio communication antenna.

However, in a communication device in related art, a non-contact power transmission coil and a proximity radio communication antenna are arranged independently from each other. Accordingly, to make both the non-contact power transmission and the proximity radio communication available, a user have to perform alignment for both the non-contact power transmission coil and the proximity radio communication antenna.

For this reason, when the location of the communication device is shifted or the direction thereof is rotated on the transmission side or the reception side after the alignment, one or both of the non-contact power transmission and the proximity radio communication are unavailable.

In light of the foregoing, it is desirable to provide an antenna module, an information communication device, and an information communication system which are novel and improved and which can use both the proximity radio communication and the non-contact power transmission even if the direction of a communication device on the transmission side or the reception side is rotated.

According to an embodiment of the present disclosure, there is provided an antenna module including a non-contact power transmission coil, and a proximity radio communication antenna formed coaxially with the non-contact power transmission coil.

Further, according to an embodiment of the present disclosure, there is provided an information communication device including a non-contact power transmission coil, a proximity radio communication antenna formed coaxially with the non-contact power transmission coil, a power transmission control unit configured to control power transmission to the non-contact power transmission coil, and a communication control unit configured to control a signal to the proximity radio communication antenna.

Further, according to an embodiment of the present disclosure, there is provided an information communication system including a first information communication device, and a second information communication device, the first information communication device including a first non-contact power transmission coil, a first proximity radio communication antenna formed coaxially with the first non-contact power transmission coil, a power transmission control unit configured to control power feed to the first non-contact power transmission coil, and a first communication control unit configured to control communication with the first proximity radio communication antenna, the second information communication device including a second non-contact power transmission coil corresponding to the first non-contact power transmission coil, a second proximity radio communication antenna formed coaxially with the second non-contact power transmission coil and corresponding to the first proximity radio communication antenna, a power reception control unit configured to control power reception from the second non-contact power transmission coil, and a second communication control unit configured to control communication with the second proximity radio communication antenna.

According to the embodiment of the present disclosure as described above, it is possible to use both the proximity radio communication and the non-contact power transmission even if the direction of the communication device on the transmission side or the reception side is rotated.

BRIEF DESCRIPTION OF THE DRAWINGS

FIG. 4 is an explanatory diagram illustrating a mode of transmission and reception in an antenna module in a comparative example;

FIG. 5 shows top and cross-sectional diagrams illustrating a structure of the antenna module according to the first embodiment;

FIG. 18 is a cross-sectional diagram illustrating a configuration of Modification 7 of the antenna module according to the second embodiment.

DETAILED DESCRIPTION OF THE EMBODIMENTS

Figure 1:
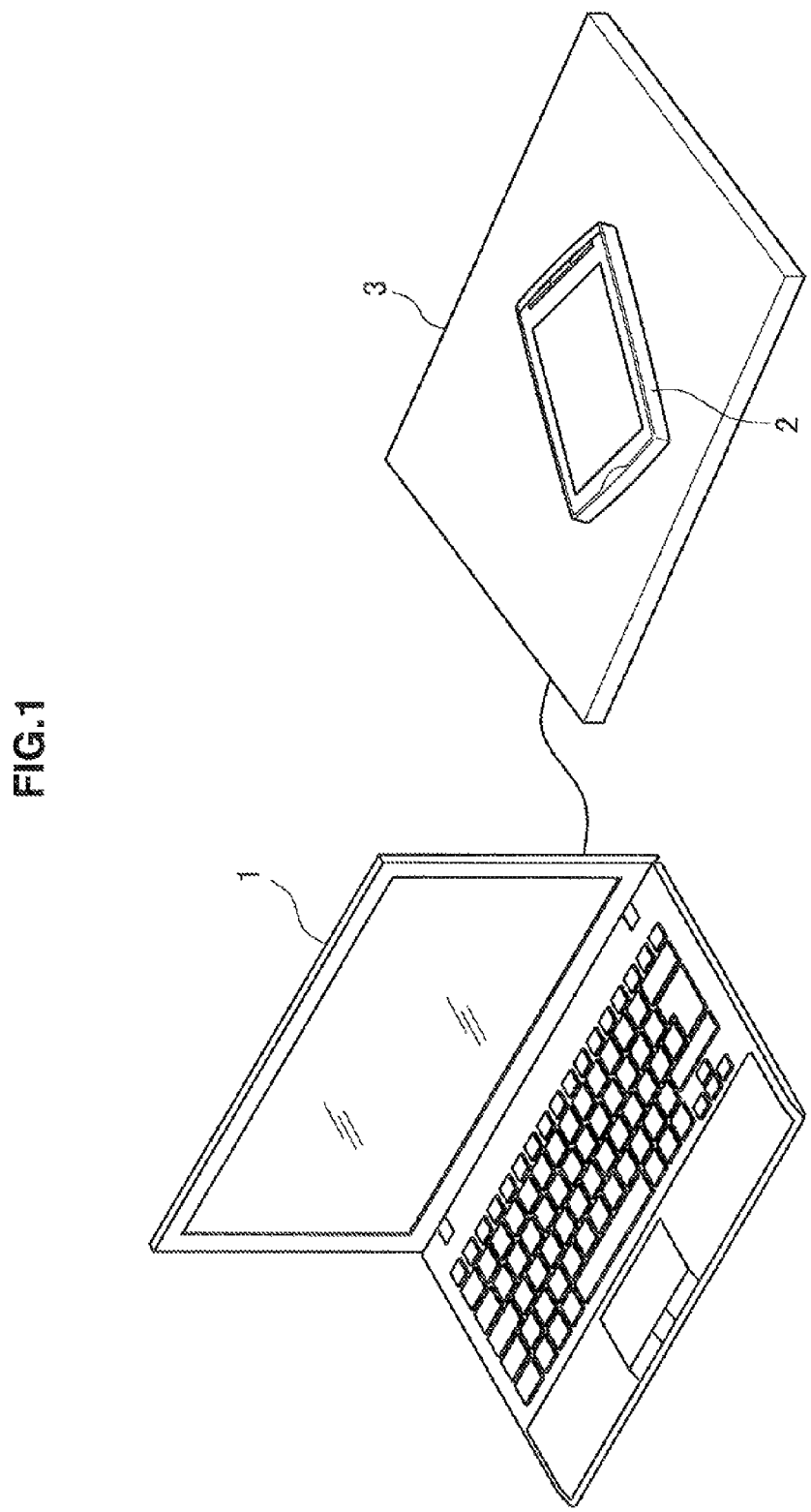
FIG. 1 is a schematic diagram illustrating an example of using an information communication device including an antenna module according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.

1. First Embodiment
 1.1. Overall Configuration of Information Communication Device Including Antenna Module According to First Embodiment
 1.2. Configurations of Antenna Modules in Comparative Examples
 1.3. Configuration of Antenna Module According to First Embodiment
 1.4. Modifications of Antenna Module According to First Embodiment
2. Second Embodiment
 2.1. Outline of Second Embodiment
 2.2. Overall Configuration of Imaging Apparatus Including Antenna Module According to Second Embodiment
 2.3. Configuration of Antenna Module According to Second Embodiment
 2.4. Modifications of Antenna Module According to Second Embodiment
  2.4.1. Modification 1
  2.4.2. Modification 2
  2.4.3. Modification 3
  2.4.4. Modification 4
  2.4.5. Summary of Modifications 1 to 4
  2.4.6. Modification 5
  2.4.7. Modification 6
  2.4.8. Modification 7
3. Summarization <1. First Embodiment>

[1.1. Overall Configuration of Information Communication Device Including Antenna Module According to First Embodiment]

Firstly, an overall configuration of an information communication device 2 according to a first embodiment of the present disclosure including an antenna module will be described with reference to FIGS. 1 and 2.

FIG. 1 is a schematic diagram illustrating an example of using the information communication device 2 including the antenna module according to the first embodiment of the present disclosure. As illustrated in FIG. 1, the information communication device 2 including the antenna module is placed on a cradle 3 connected to an electronic computer 1.

The information communication device 2 is an information processing apparatus including the antenna module according to the first embodiment. The information communication device 2 may be, for example, a mobile terminal, a mobile phone, or a smartphone. The information communication device 2 can simultaneously perform proximity radio communication and non-contact power transmission with the cradle 3 by using the antenna module according to the first embodiment. The information communication device 2 is placed on the cradle 3, and thereby can perform large-volume data communication with the cradle 3 and charging.

Like the information communication device 2, the cradle 3 includes an antenna module according to the first embodiment and performs the proximity radio communication and the non-contact power transmission with the information communication device 2. The cradle 3 includes the antenna module corresponding to the antenna module of the information communication device 2 and a placement surface where the information communication device 2 is placed, and is connected to the electronic computer 1.

The electronic computer 1 is connected to the cradle 3 and controls the data communication with the information communication device 2 and charging of the information communication device 2. The electronic computer 1 may be a general-purpose computer or a dedicated information processing apparatus with the cradle 3 integrated therein. When the electronic computer 1 is the general-purpose computer, the electronic computer 1 may be connected to the cradle 3 through a USB (Universal Serial Bus) or the like.

Note that the cradle 3 is connected to the electronic computer 1 in the description above, but may be directly connected to a network through a LAN (Local Area Network) or the like. In such a case, the cradle 3 performs the data communication with a server or the like through the network.

As described above, the information communication device 2 including the antenna module according to the first embodiment is placed at a predetermined position of the cradle 3 including the corresponding antenna module, and thereby can simultaneously perform the large-volume data communication, the charging by the power transmission, and the like.

Note that the embodiment of the technology according to the present disclosure is not limited to only the example in which the proximity radio communication and the non-contact power transmission are performed between the information communication device 2 and the cradle 3 which are described above. For example, the embodiment of the technology according to the present disclosure is applicable to a case where the proximity radio communication and the non-contact power transmission are performed between a plurality of information communication devices 2.

Subsequently, an internal configuration of the information communication device 2 including the antenna module according to the first embodiment will be described with reference to FIG. 2. FIG. 2 is a block diagram illustrating the internal configuration of the information communication device 2 including the antenna module according to the first embodiment.

Figure 2:
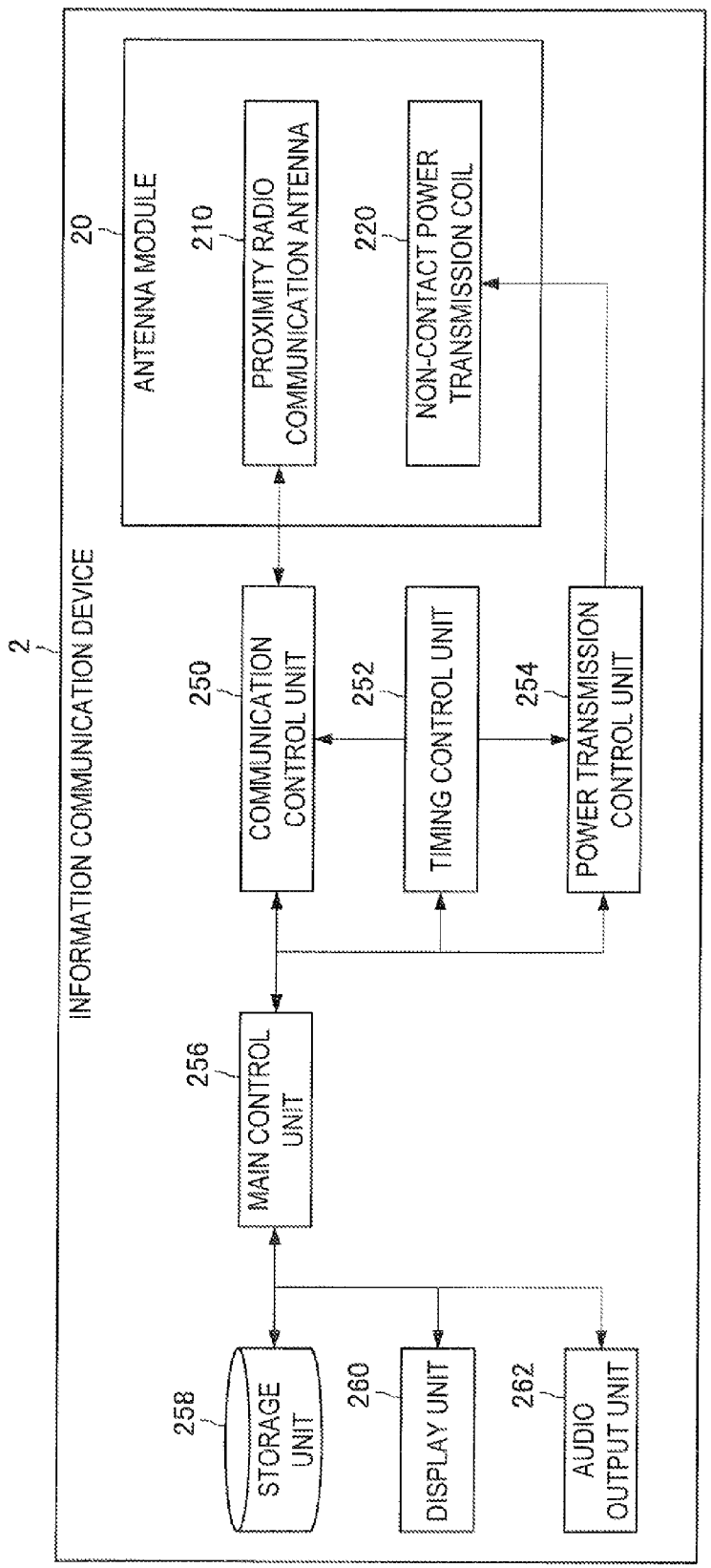
FIG. 2 is a block diagram illustrating an internal configuration of the information communication device including the antenna module according to the first embodiment.

As illustrated in FIG. 2, the information communication device 2 includes an antenna module 20 including a proximity radio communication antenna 210 and a non-contact power transmission coil 220, a communication control unit 250, a timing control unit 252, a power transmission control unit 254, a main control unit 256, a storage unit 258, a display unit 260, and an audio output unit 262.

The proximity radio communication antenna 210 is provided in the antenna module 20 and performs the proximity radio communication. As a proximity radio communication technique, it is possible to use "TransferJet (registered trademark)" which transfers a signal by utilizing a coupling effect of an induction field, NFC (Near Field Communication) using an electromagnetic induction method, or the like. Such a communication technique is implemented by using a communication circuit configured to process a high-frequency signal, an electrode for coupling, and a resonance circuit configured to supply a high-frequency signal to the electrode for coupling. In the present specification, the electrode for coupling or a part including the electrode for coupling and the resonance circuit is referred to as a "coupler". Note that the coupler may further include ground. In such a case, the electrode for coupling is arranged a certain distance away from the ground.

The proximity radio communication antenna 210 is configured of the coupler and can perform the proximity radio communication. The coupler has a characteristic that high gain can be obtained at a short distance but the gain is drastically attenuated at a longer distance. For this reason, interference with another wireless communication is less likely to occur, and thus the coupler can favorably be used for the proximity radio communication. For example, an effective range of the proximity radio communication is several centimeters or smaller. A configuration of the coupler configuring the proximity radio communication antenna 210 will be described in detail in [1.3. Configuration of Antenna Module According to First Embodiment] and subsequent sections.

The non-contact power transmission coil 220 is provided in the antenna module 20 and performs the non-contact power transmission. The non-contact power transmission is performed, for example, in such a manner that coils are provided in both a power receiving device and power feeding device to utilize electromagnetic induction or magnetic field resonance between the coils.

The communication control unit 250 controls communication performed through the proximity radio communication antenna 210. Specifically, the communication control unit 250 controls data in the communication, communication setting, and the like. The power transmission control unit 254 controls the power transmission through the non-contact power transmission coil 220. Specifically, the power transmission control unit 254 controls setting and the like related to the power transmission.

The timing control unit 252 is connected to the communication control unit 250 and the power transmission control unit 254, and controls timing of the proximity radio communication and the non-contact power transmission. Specifically, the timing control unit 252 notifies the communication control unit 250 and the power transmission control unit 254 of timing of start and end of the communication and the power transmission so that the proximity radio communication and the non-contact power transmission can be performed simultaneously or in a time division manner. Here, when the timing control unit 252 performs the proximity radio communication and the non-contact power transmission in the time division manner, it is possible to prevent the proximity radio communication and the non-contact power transmission from interfering with each other.

The main control unit 256 controls operation and setting of each component of the information communication device 2. Specifically, the main control unit 256 controls the communication control unit 250, the timing control unit 252, and the power transmission control unit 254, and controls overall operation related to the proximity radio communication and the non-contact power transmission. The main control unit 256 also controls the storage unit 258, the display unit 260, and the audio output unit 262, and also controls operation other than the proximity radio communication and the non-contact power transmission by the information communication device 2.

Here, the communication control unit 250, the power transmission control unit 254, the timing control unit 252, and the main control unit 256 may be implemented by a control IC (Integrated Circuit) or the like, or an arithmetic processing unit configured of a CPU (Central Processing Unit) or the like.

The storage unit 258 is a storage medium configured to store various types of information, programs, and the like which are used for the operation of the information communication device 2. For example, the storage unit 258 stores a program used by the main control unit 256 for controlling the components of the information communication device 2, and programs used by the communication control unit 250, the power transmission control unit 254, and the timing control unit 252 for controlling the proximity radio communication and the non-contact power transmission. The storage unit 258 may also store communication data such as file data transmitted and received by the proximity radio communication antenna 210. Note that the storage unit 258 may be implemented by a non-volatile memory such as a flash memory, or a magnetic recording medium such as a HDD (Hard Disk Drive) device.

The display unit 260 performs displaying for providing a user of the information communication device 2 with information by using an image. For example, the display unit 260 is implemented by a liquid crystal display (LCD) device, an OLED (Organic Light Emitting Diode), or the like. The audio output unit 262 performs output for providing the user of the information communication device 2 with information by using audio. The audio output unit 262 includes audio output devices such as a speaker and a headphone, and outputs audio by converting audio data or the like into audio.

The configuration of the information communication device 2 including the antenna module 20 according to the first embodiment has been described in detail with reference to FIGS. 1 and 2. By including the timing control unit 252, the information communication device 2 can control timing of the proximity radio communication and the non-contact power transmission so that the proximity radio communication and the non-contact power transmission can be performed simultaneously or in the time division manner. This enables the information communication device 2 to operate flexibly in such a manner that the timing is controlled in the time division manner when it is desirable to prevent interference between the proximity radio communication and the non-contact power transmission or that the same timing is used to give priority to efficiency when the interference is not serious.

[1.2. Configurations of Antenna Modules in Comparative Examples]

Figure 3A:
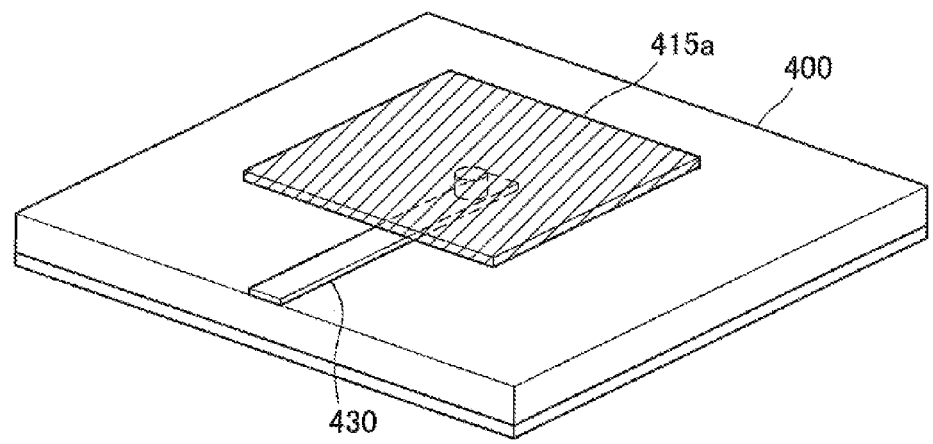
FIG. 3A is an explanatory diagram illustrating a specific example of a proximity radio communication antenna included in an antenna module in a comparative example.
Figure 3B:
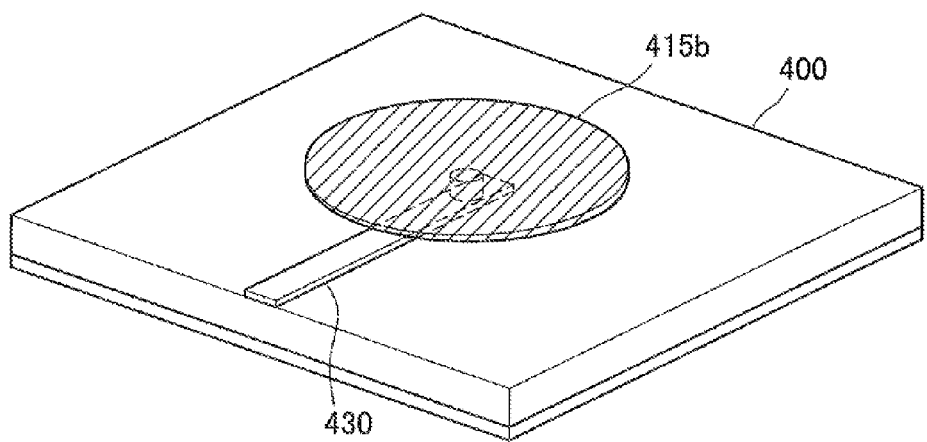
FIG. 3B is an explanatory diagram illustrating another specific example of a proximity radio communication antenna included in an antenna module in a comparative example.

Next, configurations of antenna modules in comparative examples will be described with reference to FIGS. 3A, 3B, and 4. FIGS. 3A and 3B are explanatory diagrams each illustrating a specific example of a proximity radio communication antenna included in the antenna module in the corresponding comparative example. As illustrated in FIGS. 3A and 3B, the proximity radio communication antenna included in the antenna module in the comparative example includes a dielectric substrate 400, a feedline 430, and a coupler device 415 (that is, a coupler device 415a or a coupler device 415b).

The dielectric substrate 400 is formed of, for example, a resin substrate, a resin film, or a ceramic substrate. The dielectric substrate 400 is provided with: the feedline 430 and the coupler device 415 on one surface of the dielectric substrate 400; and ground on the other surface on the opposite side. The feedline 430 is connected to the coupler device 415 through a columnar conductor.

Here, a coupler transmits information by using a longitudinal wave component of an electromagnetic wave, and thus it is desirable to connect the feedline 430 to one point which is the center of the coupler device 415 to prevent an electromagnetic wave generated by the coupler from becoming a polarized wave having a high transverse wave component. In contrast, the coupler device 415 is formed of a plate-shaped electrode in a rectangular or circular shape. A specific example of the plate-shaped electrode of the coupler device 415 having the rectangular shape is the coupler device 415a in FIG. 3A, and a specific example of the plate-shaped electrode of the coupler device 415 having the circular shape is the coupler device 415b in FIG. 3B.

FIG. 4 is an explanatory diagram illustrating a specific example of a mode of transmission and reception in an antenna module in the comparative example. As illustrated in FIG. 4, an antenna module 402 in the comparative example includes a proximity radio communication antenna 412 and a non-contact power transmission coil 422 each of which is arranged on the antenna module 402. Likewise, an antenna module 402' which is a transmission and reception counterpart also includes a proximity radio communication antenna 412' and a non-contact power transmission coil 422'.

The proximity radio communication antenna 412 has the configuration described above with reference to FIGS. 3A and 3B, and thus is arranged independently from the non-contact power transmission coil 422. When the proximity radio communication and the non-contact power transmission are simultaneously enabled between the antenna modules 402 and 402' which have such a configuration, it is necessary to perform alignment between the proximity radio communication antennas 412 and 412' and between the non-contact power transmission coils 422 and 422' as illustrated in FIG. 4. In other words, it is necessary to perform alignment at two points each between the antenna modules 402 and 402', and thus a relative position between the antenna modules 402 and 402' is substantially fixed.

Here, when any of the antenna modules 402 and 402' is rotated, one or both of the proximity radio communication and the non-contact power transmission become unavailable. Thus, in the antenna module 402 in the comparative example having the configuration as illustrated in FIG. 4, it is difficult to rotate the antenna module 402 or 402' while both the proximity radio communication and the non-contact power transmission are simultaneously available.

In addition, when a distance between the proximity radio communication antenna 412 and the non-contact power transmission coil 422 differs between the antenna modules 402 and 402' in the comparative example, it is not possible to simultaneously make both the proximity radio communication and the non-contact power transmission available. In particular, between information communication devices 2 which have respective different antenna modules, the distance between the proximity radio communication antenna 412 and the non-contact power transmission coil 422 is highly likely to differ. Thus, it is difficult to make both the proximity radio communication and the non-contact power transmission available substantially simultaneously.

As the result of earnest studies on an antenna module or the like including a proximity radio communication antenna and a non-contact power transmission coil, the present inventors have cleared the aforementioned difficulty and the like and have conceived the antenna module according to the first embodiment to be described later. Hereinafter, a configuration of the antenna module according to the first embodiment will be described with reference to FIGS. 5 to 8.

[1.3. Configuration of Antenna Module According to First Embodiment]

Firstly, the configuration of the antenna module 20 according to the first embodiment will be described with reference to FIG. 5. FIG. 5 shows top and cross-sectional diagrams illustrating a structure of the antenna module 20 according to the first embodiment of the present disclosure. More specifically, an upper part of FIG. 5 is the top diagram of the antenna module 20, and a lower part of FIG. 5 is the cross-sectional diagram of the antenna module 20 taken along the A-A' line of the top diagram and made to face another antenna module with which communication and power transmission are performed.

As illustrated in the top diagram in the upper part of FIG. 5, the antenna module 20 includes a dielectric substrate 200, a proximity radio communication antenna 210, and a non-contact power transmission coil 220. As illustrated in the cross-sectional diagram in the lower part of FIG. 5, the proximity radio communication antenna 210 and the non-contact power transmission coil 220 are formed on the same plane of the dielectric substrate 200.

The dielectric substrate 200 is provided with the proximity radio communication antenna 210 and the non-contact power transmission coil 220 on one surface of the dielectric substrate 200. The dielectric substrate 200 may also be provided with ground (not shown) on the other surface on the opposite side from the one surface. The dielectric substrate 200 is formed of, for example, a resin substrate, a resin film, or a ceramic substrate.

The non-contact power transmission coil 220 is formed as a coil formed by a litz wire, a plated wire, or the like. In the embodiment of the present disclosure, the structure of the non-contact power transmission coil 220 is not particularly limited, and various modes can be employed. For example, the number of windings, the winding direction, and the like of the non-contact power transmission coil 220 can be set appropriately for optimum setting, and may be set in accordance with a predetermined standard.

The proximity radio communication antenna 210 is formed as a ring-shaped or polygonal annular coupler for electromagnetic field coupling. In addition, the proximity radio communication antenna 210 is formed on the outer peripheral side of the non-contact power transmission coil 220 to be coaxial with the non-contact power transmission coil 220.

With reference to the cross-sectional diagram in the lower part of FIG. 5, it is learned that alignment between the proximity radio communication antenna 210 and a proximity radio communication antenna 210' and between the non-contact power transmission coil 220 and a non-contact power transmission coil 220' is completed by aligning the center of the antenna module 20 with the center of the other antenna module facing the antenna module 20.

In addition, each of the proximity radio communication antenna 210 and the non-contact power transmission coil 220 is isotropic with respect to the axial center. Thus, even if the antenna module 20 rotates about the axial center, the positional relationship does not change. Thus, it is possible to perform: the proximity radio communication between the proximity radio communication antennas 210 and 210'; and the non-contact power transmission between the non-contact power transmission coils 220 and 220'.

Note that the antenna module 20 does not include ground in the embodiment illustrated in the top diagram in the upper part of FIG. 5, but the embodiment of the technology of the present disclosure is not limited to the example. For example, the antenna module 20 may include ground. In such a case, the ground is formed on the other surface on the opposite side of the dielectric substrate 200 from the one surface on which the proximity radio communication antenna 210 is formed.

In addition, the embodiment of the technology of the present disclosure is not limited to the aforementioned embodiment. For example, the antenna module 20 may further include a magnetic material sheet between: the dielectric substrate 200; and the proximity radio communication antenna 210 and the non-contact power transmission coil 220. The magnetic material sheet is, for example, a sheet formed by mixing a metal which is a magnetic material with polymers, and absorbs magnetic fields due to its high magnetic permeability, the magnetic fields being generated by the proximity radio communication antenna 210 and the non-contact power transmission coil 220. Thereby, the magnetic material sheet can check generation of heat from a metal such as the substrate provided with the antenna module 20 inside the device, the heat being generated due to eddy currents caused by electromagnetic induction of the magnetic fields.

As described above, the antenna module 20 according to the embodiment of the present disclosure is formed so that the proximity radio communication antenna 210 and the non-contact power transmission coil 220 can be coaxial with each other. Thus, even if the antenna module 20 is rotated, alignment of the center position of the non-contact power transmission coil 220 makes both the proximity radio communication and the non-contact power transmission available. In addition, in alignment between the antenna modules, alignment of only one position which is the center of the non-contact power transmission coil 220 makes it possible to perform alignment between the proximity radio communication antennas 210 and 210' and between the non-contact power transmission coils 220 and 220'.

Further, the proximity radio communication antenna 210 and the non-contact power transmission coil 220 have the same center, and thus a possibility can be eliminated that the distance between the center of the proximity radio communication antenna 210 and the center of the non-contact power transmission coil 220 differs between the information communication devices 2 including the respective different antenna modules.

Moreover, the proximity radio communication antenna 210 may be formed on the outer peripheral side of the non-contact power transmission coil 220. Such a structure enables the non-contact power transmission coil 220 to have any shape, and thus increases the degree of freedom in design. In particular, even if the non-contact power transmission coil 220 has to have a shape defined in a certain national or international standard, the antenna module according to the first embodiment makes it possible to achieve easy designing. Here, although the proximity radio communication antenna 210 is formed on the outer peripheral side of the non-contact power transmission coil 220 in the embodiment described above, the embodiment of the technology of the present disclosure is not limited to the example. For example, the proximity radio communication antenna 210 may be located on the internal peripheral side of the non-contact power transmission coil 220.

Here, a publicly known moving coil method or the like may be used for the center alignment of the non-contact power transmission coil 220 between the antenna modules 20. In each antenna module 20 according to the first embodiment, when the center alignment of the non-contact power transmission coil 220 is performed, the proximity radio communication antenna 210 is also aligned by itself regardless of the angle of the antenna module 20. Thus, when the moving coil method is used, the antenna module 20 according to the first embodiment can automatically perform the alignment for not only the proximity radio communication but also the non-contact power transmission, thus enhancing the convenience.

Figure 6:
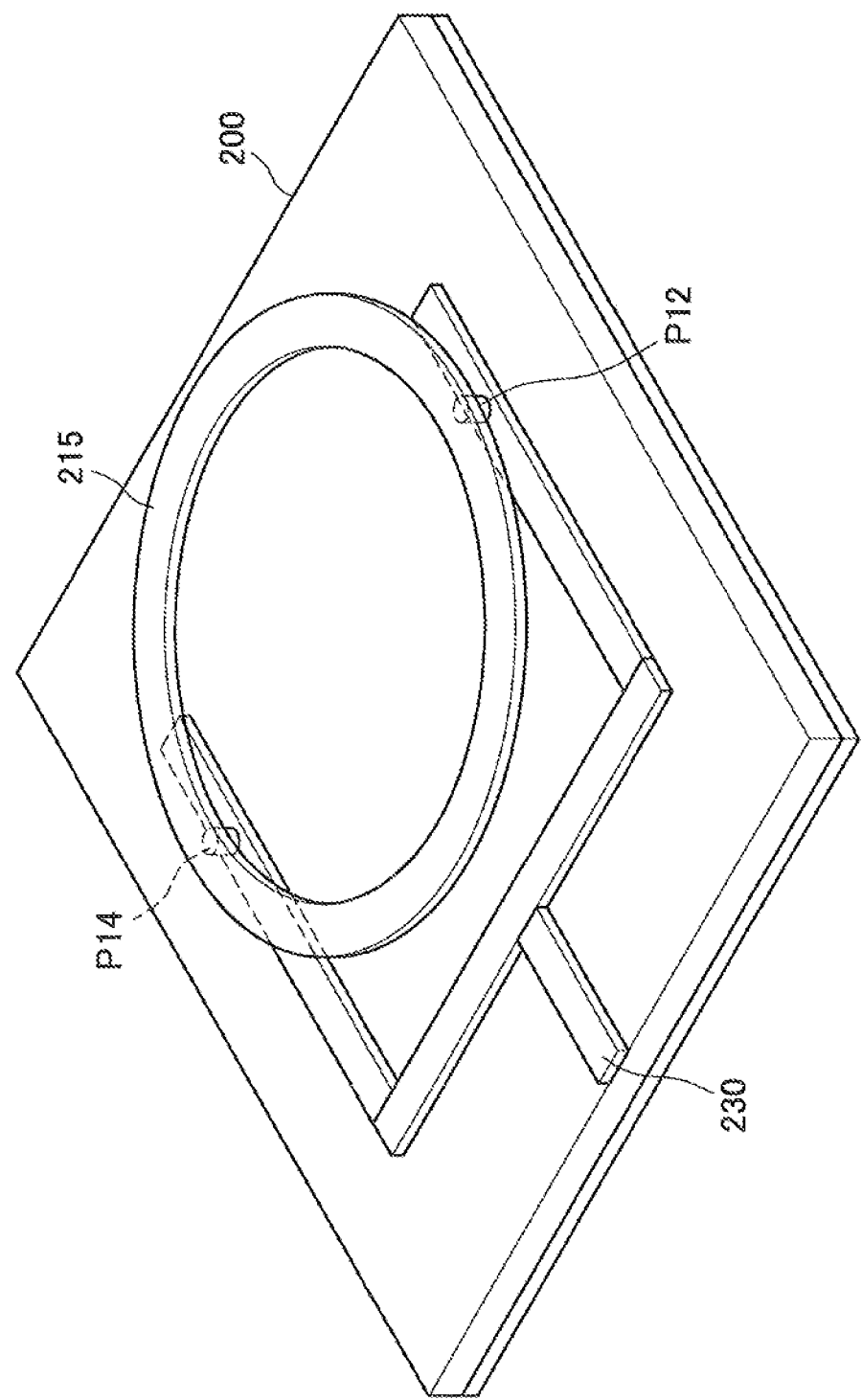
FIG. 6 is a perspective diagram illustrating a structure of a proximity radio communication antenna included in the antenna module according to the first embodiment.

Subsequently, a configuration of the proximity radio communication antenna 210 included in the antenna module 20 according to the first embodiment will further be described with reference to FIG. 6. FIG. 6 is a perspective diagram illustrating a structure of the proximity radio communication antenna 210 according to the first embodiment. Here, FIG. 6 omits the non-contact power transmission coil 220 for clarification of the drawing, and illustrates only the configuration related to the proximity radio communication antenna 210.

As illustrated in FIG. 6, the proximity radio communication antenna 210 included in the antenna module 20 is formed as the ring-shaped or polygonal annular coupler for the electromagnetic field coupling, and is provided with a feedline 230 and a coupler device 215 on the dielectric substrate 200. Since the dielectric substrate 200 is substantially the same as the proximity radio communication antenna in the comparative example, a detailed description thereof is omitted herein. Herein, a description is given of a characteristic configuration of the coupler which is the proximity radio communication antenna 210 according to the embodiment of the present disclosure.

The coupler device 215 has a ring or polygonal annular shape and receives power from the branched feedline 230 at two connection points P12 and P14 through columnar conductors. Here, P12 and P14 are set so that a line connecting P12 and P14 can pass through the center of the coupler device 215, and the coupler device 215 receives power from the feedline 230 to P12 and P14 in the same phase. With such a configuration, the coupler device 215 is not allowed to be used as an ordinary antenna, but allowed to be used as the proximity radio communication antenna. The configuration also leads to mismatching in input matching in the coupler device 215 when the proximity radio communication is not performed, and thus unnecessary radiation can be checked. Note that as long as the coupler device 215 can be used as the proximity radio communication antenna, the positions of the power feed points and the phase of the power feed are not limited to those in the embodiment described above. Even though the power is not fed in the same phase, appropriately setting the power feed positions makes it possible to provide the coupler device 215 with the function of the proximity radio communication antenna.

Further, the feedline 230 may be set to have a length equivalent to a multiple of ¼ of a communication frequency wavelength. When the feedline 230 has such a length, it is possible to further increase a band of the proximity radio communication.

[1.4. Modifications of Antenna Module According to First Embodiment]

Figure 7:
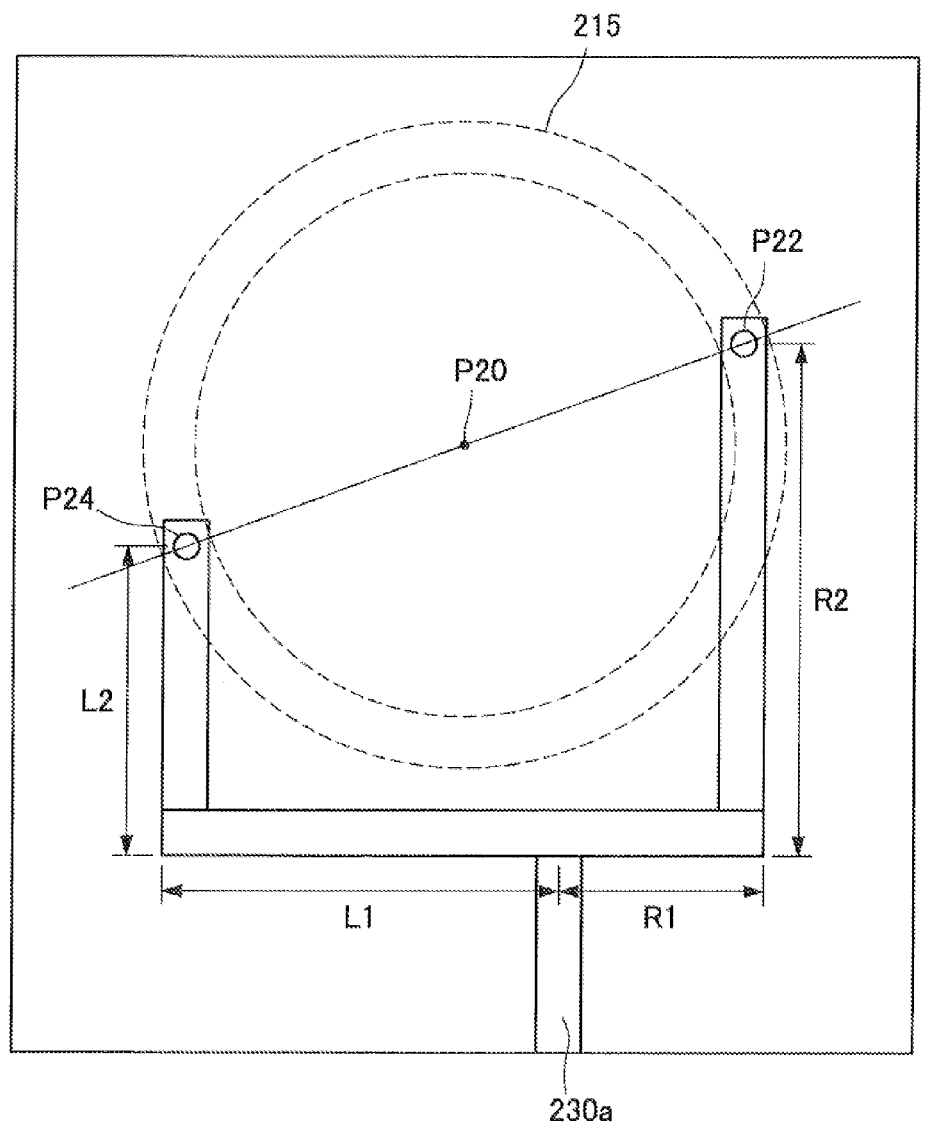
FIG. 7 is a top diagram illustrating a first modification of the proximity radio communication antenna included in the antenna module according to the first embodiment.
Figure 8:
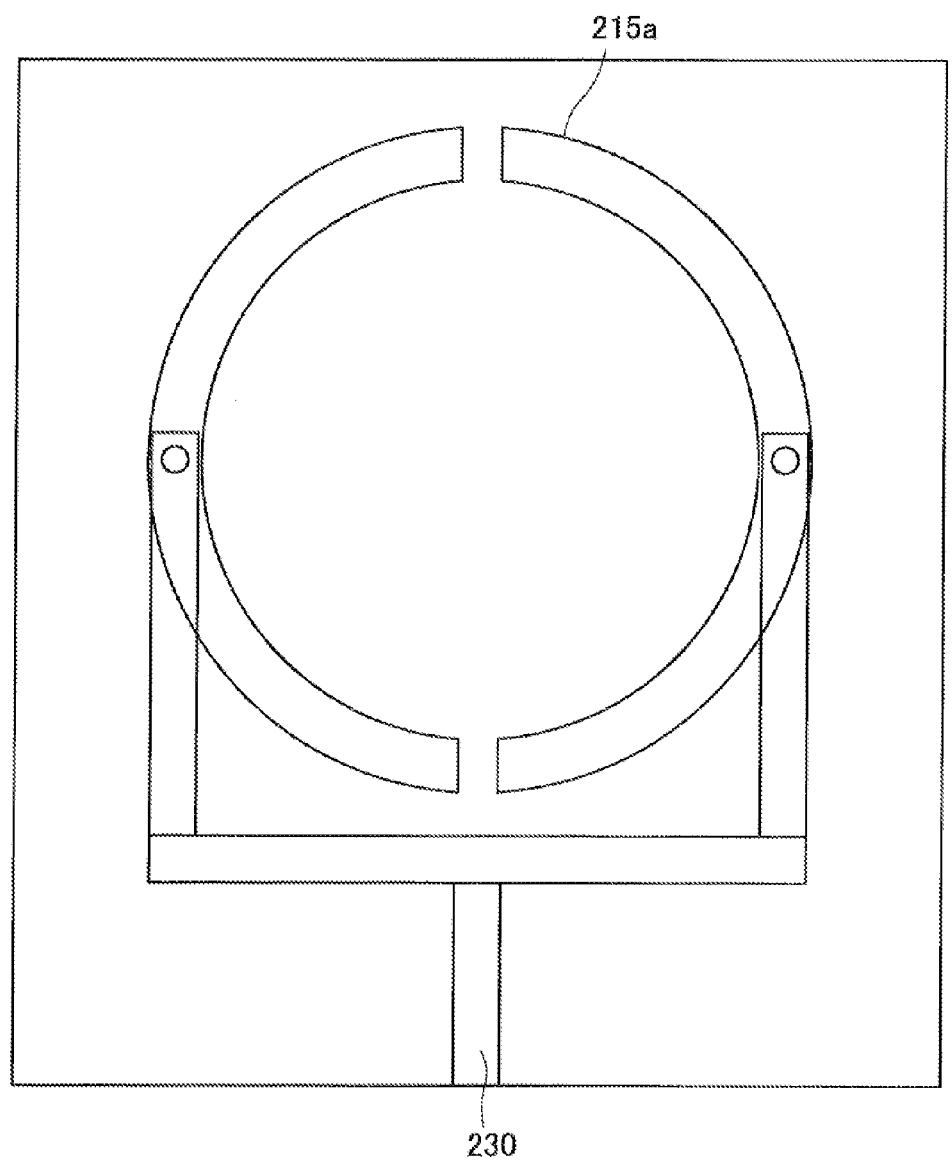
FIG. 8 is a top diagram illustrating a second modification of the proximity radio communication antenna included in the antenna module according to the first embodiment.

The description has been given of the characteristic configuration of the proximity radio communication antenna 210 according to the first embodiment. Next, modifications of the proximity radio communication antenna will be described with reference to FIGS. 7 and 8. FIGS. 7 and 8 are top diagrams illustrating first and second modifications of the proximity radio communication antenna 210 according to the first embodiment. Here, FIGS. 7 and 8 omit the non-contact power transmission coil 220 for clarification and illustrate only the configuration related to the proximity radio communication antenna 210.

As illustrated in FIG. 7, in the first modification of the proximity radio communication antenna 210, a feedline 230a is formed to have a shape different from the shape of the feedline 230 illustrated in FIG. 6. Specifically, the feedline 230a has an asymmetrical shape, and the coupler device 215 receives power from the feedline 230a at connection points P22 and P24.

Also in the modification, P22 and P24 are set so that a line connecting P22 and P24 can pass through a center point P20 of the coupler device 215. In addition, the feedline 230a is designed so that distances "L1+L2" and "R1+R2" of the feedline 230a to P24 and P22, respectively, can be equal to each other, and thereby the power is fed to the coupler device 215 in the same phase. In other words, it is learned that also in the modification as illustrated in FIG. 7, the technical concept of the present disclosure can be realized and is included in the technical scope of the present disclosure. Further, even though the power is not fed in the same phase, appropriately setting the power feed positions as described above makes it possible to provide the coupler device 215 with the function of the proximity radio communication antenna. The embodiment of the technology of the present disclosure is not limited to the modification described above and can be achieved in various modes.

In addition, as illustrated in FIG. 8, in the second modification of the proximity radio communication antenna 210, a coupler device 215a has slits, unlike the shape of the coupler device 215 illustrated in FIG. 6. Specifically, the slits are provided at positions symmetrical with respect to the center of the coupler device 215a in such a manner as to divide the coupler device 215a. Since the proximity radio communication antenna 210 and the non-contact power transmission coil 220 are coaxially formed in the antenna module 20, the electromagnetic induction due to the non-contact power transmission causes an eddy current on the coupler device 215, so that the non-contact power transmission efficiency is lowered. However, as illustrated in FIG. 8, providing the slits in the coupler device 215a checks the generation of the eddy current and can prevent the non-contact power transmission efficiency from being lowered.

Here, the slits are formed at the two positions symmetrical with respect to the center of the coupler device 215a, but the embodiment of the present disclosure is not limited to the example. For example, the slits may be provided at three or more positions to be symmetrical with respect to the center of the coupler device 215a or at only one position.

<2. Second Embodiment>
[2.1. Outline of Second Embodiment]

The description has been given in detail of the antenna module 20 according to the first embodiment, including the information communication device 2 including the antenna module 20. Hereinafter, a description is given in detail of an antenna module according to a second embodiment and an imaging apparatus including the antenna module.

The antenna module 20 according to the first embodiment has the one proximity radio communication antenna 210 and the one non-contact power transmission coil 220, and performs the proximity radio communication and the non-contact power transmission with the external information communication device 2 or the cradle 3. In contrast, the antenna module according to the second embodiment has two or more proximity radio communication antennas and two or more non-contact power transmission coils, and performs the proximity radio communication and the non-contact power transmission within the antenna module.

Even if the direction of the transmission or reception side of the antenna module is rotated, the antenna module according to the second embodiment of the present disclosure can use both the proximity radio communication and the non-contact power transmission. Thus, in the antenna module according to the second embodiment, with respect to one of the proximity radio communication antennas and one of the non-contact power transmission coils in the antenna module, the other proximity radio communication antenna and the other non-contact power transmission coil can rotate infinitely.

To achieve the infinite rotation as described above, a slip ring or the like having a metal contact is used. However, the slip ring has the metal contact, and thus has low reliability due to a wear or the like of the metal contact. Accordingly, it is necessary to frequently replace the metal contact with new one.

As the result of earnest studies, the present inventors have conceived the antenna module according to the second embodiment which can clear the difficulty with the slip ring or the like. Hereinafter, the second embodiment according to the present disclosure will be described with reference to FIGS. 9 to 18.

Hereinafter, an imaging apparatus including an imaging unit which rotates infinitely is exemplified as an embodiment example of the second embodiment, but the second embodiment of the present disclosure is not limited to the example. The second embodiment is applicable to any device which rotates infinitely and the like, and is also applicable to a robot arm having an infinite rotating joint, a turntable, and the like.

[2.2. Overall Configuration of Imaging Apparatus Including Antenna Module According to Second Embodiment]

Figure 9:
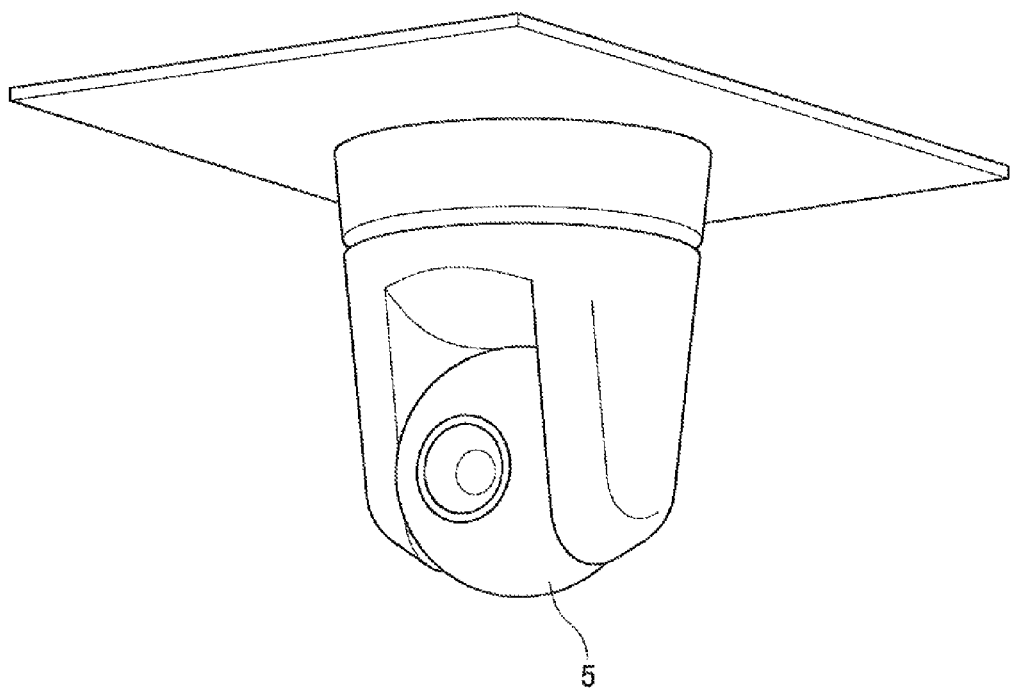
FIG. 9 is an explanatory diagram illustrating a specific example of an imaging apparatus including an antenna module according to a second embodiment of the present disclosure.

Firstly, an overall configuration of the imaging apparatus including the antenna module according to the second embodiment will be described with reference to FIGS. 9 and 10. FIG. 9 is an explanatory diagram illustrating a specific example of an imaging apparatus 5 including the antenna module according to the second embodiment. As illustrated in FIG. 9, the antenna module according to the second embodiment is implemented, for example, by being included in the imaging apparatus 5.

The imaging apparatus 5 which is a monitoring camera or the like is a device capable of taking an image of an entire peripheral area around an installation position of the imaging apparatus 5 by infinitely rotating. The imaging apparatus 5 in such a mode of installation on the ceiling is illustrated in FIG. 9, but is not limited to the example. The imaging apparatus 5 may be installed on a floor or an enclosure in an opposite direction from that in FIG. 9.

Subsequently, an internal configuration of the imaging apparatus 5 including the antenna module according to the second embodiment will be described with reference to FIG. 10. FIG. 10 is a block diagram illustrating the internal configuration of the imaging apparatus 5 including the antenna module according to the second embodiment.

Figure 10:
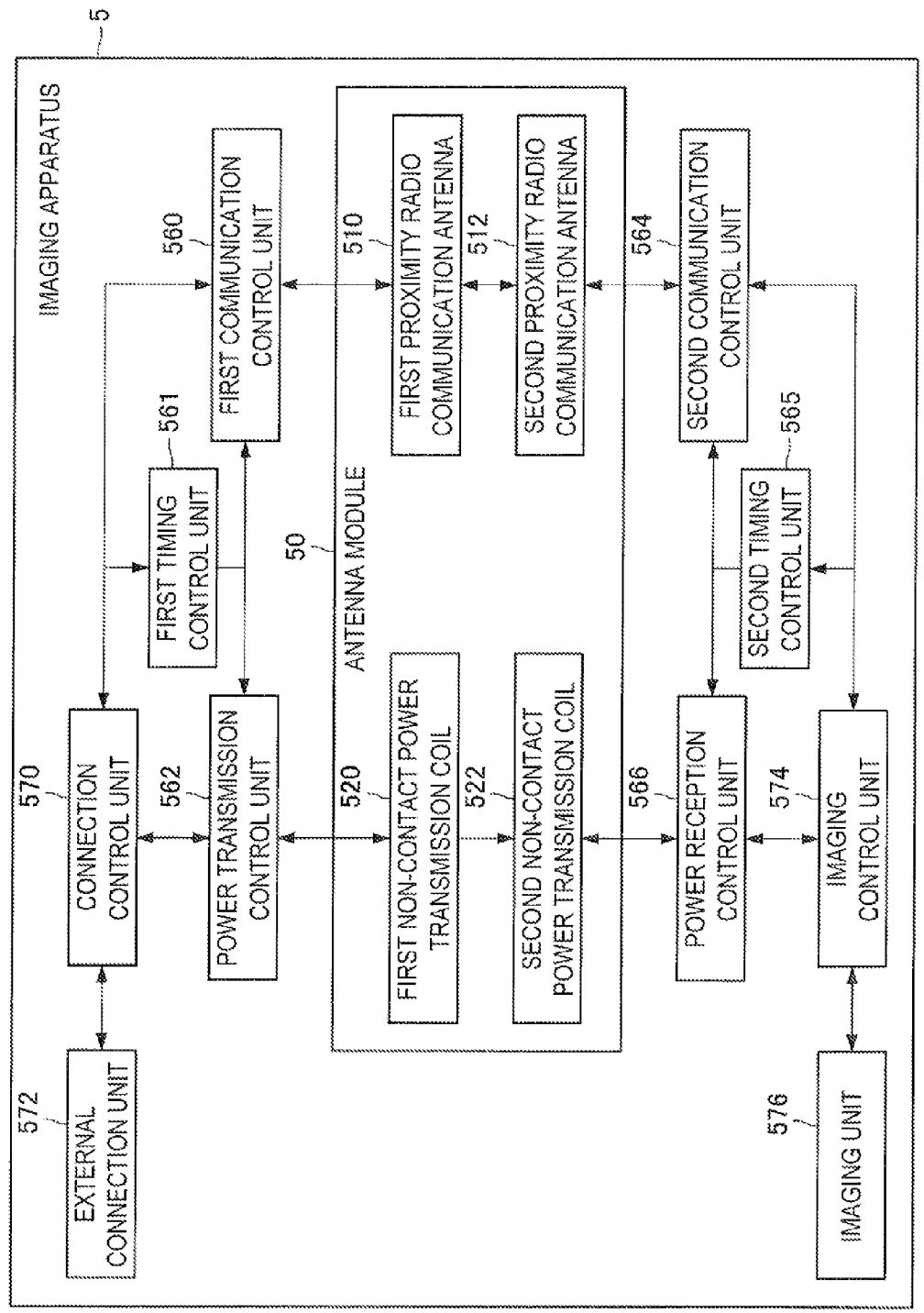
FIG. 10 is a block diagram illustrating an internal configuration of the imaging apparatus including the antenna module according to the second embodiment.

As illustrated in FIG. 10, the imaging apparatus 5 includes an antenna module 50, a first communication control unit 560, a power transmission control unit 562, a second communication control unit 564, a power reception control unit 566, a connection control unit 570, an external connection unit 572, an imaging control unit 574, and an imaging unit 576. The antenna module 50 includes a first proximity radio communication antenna 510, a second proximity radio communication antenna 512, a first non-contact power transmission coil 520, and a second non-contact power transmission coil 522.

The first proximity radio communication antenna 510 and the second proximity radio communication antenna 512 are substantially the same as the proximity radio communication antenna 210; the first non-contact power transmission coil 520 and the second non-contact power transmission coil 522, the non-contact power transmission coil 220; the first communication control unit 560 and the second communication control unit 564, the communication control unit 250; and the power transmission control unit 562 and the power reception control unit 566, the power transmission control unit 254. Thus, a detailed description thereof is herein omitted, and a configuration characteristic of the second embodiment will be described below.

The antenna module 50 has: the first proximity radio communication antenna 510 and the first non-contact power transmission coil 520; and the second proximity radio communication antenna 512 and the second non-contact power transmission coil 522 which are capable of infinitely rotating with respect to the first proximity radio communication antenna 510 and the first non-contact power transmission coil 520, respectively. In addition, the proximity radio communication is performed between the first proximity radio communication antenna 510 and the second proximity radio communication antenna 512, and the non-contact power transmission is performed between the first non-contact power transmission coil 520 and the second non-contact power transmission coil 522. Here, in the imaging apparatus 5 in FIG. 10, the first non-contact power transmission coil 520 is located on the power feeding side, while the second non-contact power transmission coil 522 is located on the power receiving side.

The first proximity radio communication antenna 510 is controlled by the first communication control unit 560, while the first non-contact power transmission coil 520 is controlled by the power transmission control unit 562. Further, a first timing control unit 561 connected to the first communication control unit 560 and the power transmission control unit 562 controls timing of both the proximity radio communication and the non-contact power transmission.

In contrast, the second proximity radio communication antenna 512 is controlled by the second communication control unit 564, while the second non-contact power transmission coil 522 is controlled by the power reception control unit 566. In addition, a second timing control unit 565 connected to the second communication control unit 564 and the power reception control unit 566 controls timing of both the proximity radio communication and the non-contact power transmission.

The external connection unit 572 is controlled by the connection control unit 570, and is connected to an external device to transmit and receive data and acquire power. The connection control unit 570 is connected to the power transmission control unit 562 and the first communication control unit 560. The connection control unit 570 delivers and receives power to and from the power transmission control unit 562 and exchange data with the first communication control unit 560.

The imaging unit 576 is controlled by the imaging control unit 574 and acquires an image of an area around the imaging unit 576. The imaging control unit 574 is connected to the power reception control unit 566 and the second communication control unit 564. The imaging control unit 574 receives power from the power reception control unit 566 and exchange data with the second communication control unit 564.

[2.3. Configuration of Antenna Module According to Second Embodiment]

The description has been given of the imaging apparatus which is the embodiment example and which includes the antenna module 50 according to the second embodiment. Next, a configuration of the antenna module 50 according to the second embodiment will be described below with reference to FIGS. 11 to 18.

Figure 11:
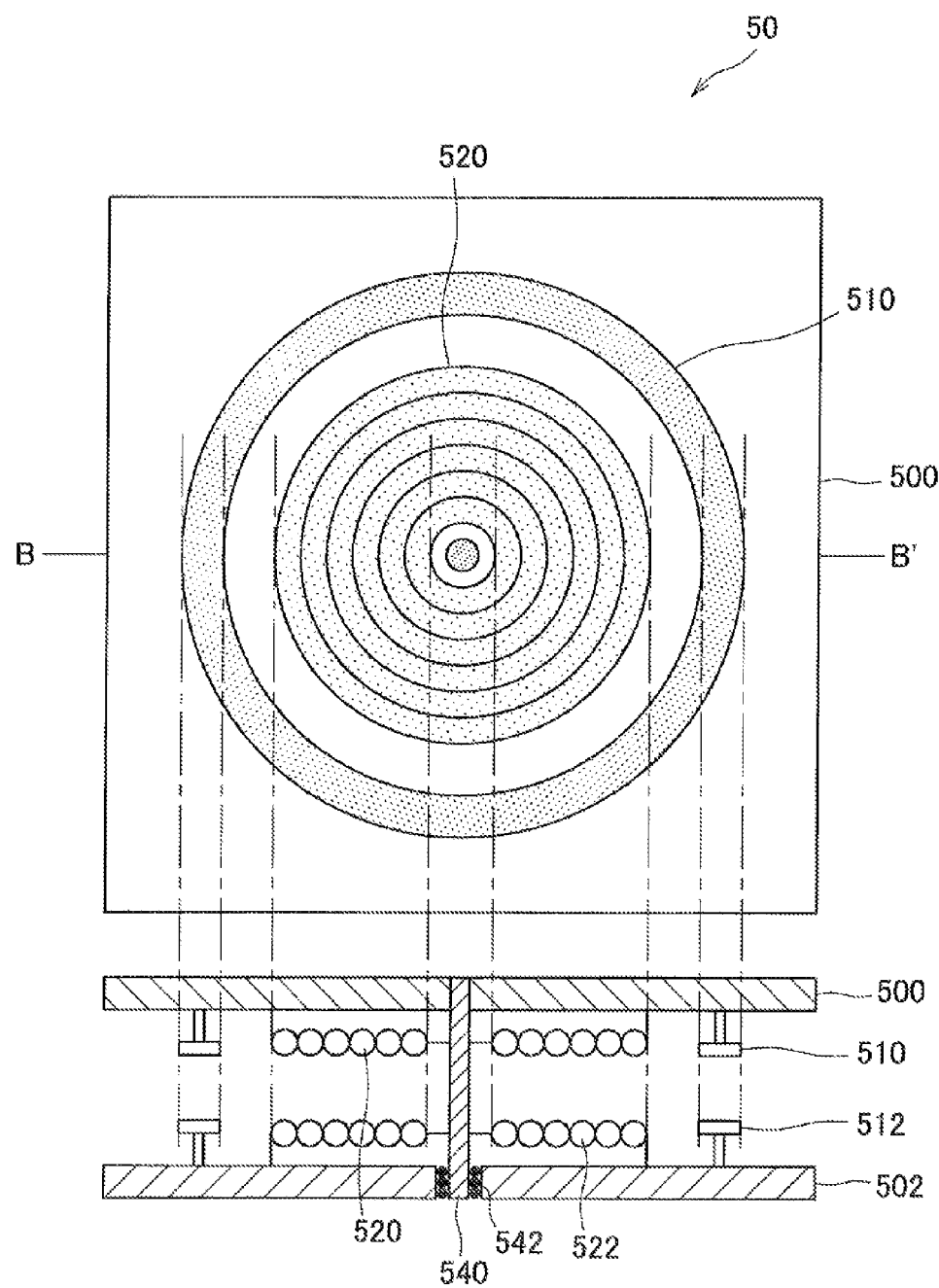
FIG. 11 shows top and cross-sectional diagrams illustrating a structure of the antenna module according to the second embodiment.

FIG. 11 shows top and cross-sectional diagrams illustrating a structure of the antenna module 50 according to the second embodiment of the present disclosure. More specifically, an upper part of FIG. 11 is the top diagram of the antenna module 50, and a lower part of FIG. 11 is the cross-sectional diagram of the antenna module 50 taken along the B-B' line of the top diagram As illustrated in the top and cross-sectional diagrams in FIG. 11, the antenna module 50 according to the second embodiment includes a first dielectric substrate 500, the first proximity radio communication antenna 510, the first non-contact power transmission coil 520, a second dielectric substrate 502, the second proximity radio communication antenna 512, the second non-contact power transmission coil 522, a rotary shaft 540, and a bearing 542.

The first dielectric substrate 500 and the second dielectric substrate 502 are substantially the same as the dielectric substrate 200: the first proximity radio communication antenna 510 and the second proximity radio communication antenna 512, the proximity radio communication antenna 210; and the first non-contact power transmission coil 520 and the second non-contact power transmission coil 522, the non-contact power transmission coil 220. Thus, a description having the content overlapping with that of the first embodiment is herein omitted, and a configuration characteristic of the second embodiment will be described below.

The first proximity radio communication antenna 510 and the first non-contact power transmission coil 520 are formed on the same plane of the first dielectric substrate 500 to be coaxial with each other. In addition, the rotary shaft 540 is formed in the axial center of the first proximity radio communication antenna 510 and the first non-contact power transmission coil 520. Further, the second proximity radio communication antenna 512 and the second non-contact power transmission coil 522 are coaxially formed on the same plane of the second dielectric substrate 502 in such a manner as to face the first proximity radio communication antenna 510 and the first non-contact power transmission coil 520.

The second dielectric substrate 502 is connected to the rotary shaft 540 at the axial center of the second proximity radio communication antenna 512 and the second non-contact power transmission coil 522 with the bearing 542 placed in between. A rolling bearing, a hydraulic bearing, or the like may be used as the bearing 542. Here, it is desirable that the rotary shaft 540 be made of a non-metal to prevent influence of eddy currents generated due to electromagnetic induction caused by magnetic fields generated in the proximity radio communication and the non-contact power transmission.

Thereby, the first proximity radio communication antenna 510 and the first non-contact power transmission coil 520 can rotate around the rotary shaft with respect to the second proximity radio communication antenna 512 and the second non-contact power transmission coil 522. In addition, all of the four components are coaxially formed, and thereby the proximity radio communication between the first proximity radio communication antenna 510 and the second proximity radio communication antenna 512 and the non-contact power transmission between the first non-contact power transmission coil 520 and the second non-contact power transmission coil 522 can be performed simultaneously while the four components rotate.

Thus, use of the second embodiment described above makes it possible to simultaneously perform data communication and power feed in a non-contact manner, while the first dielectric substrate 500 side rotates with respect to the second dielectric substrate 502 side. In addition, there is not a lead wire or the like between the first dielectric substrate 500 and the second dielectric substrate 502, and thus the rotary shaft 540 can rotate infinitely. Further, the antenna module according to the second embodiment of the present disclosure does not have a metal contact which is easily worn like the slip ring or the like, and thus can achieve a long life and high reliability.

[2.4. Modifications of Second Embodiment]

Subsequently, modifications of the antenna module according to the second embodiment will be described with reference to FIGS. 12 to 18. FIGS. 12 to 17 are cross-sectional diagrams respectively illustrating configurations in Modifications 1 to 6 of the antenna module according to the second embodiment, and FIG. 18 is a perspective diagram illustrating a configuration in Modification 7 of the antenna module according to the second embodiment.

(2.4.1. Modification 1)

Figure 12:
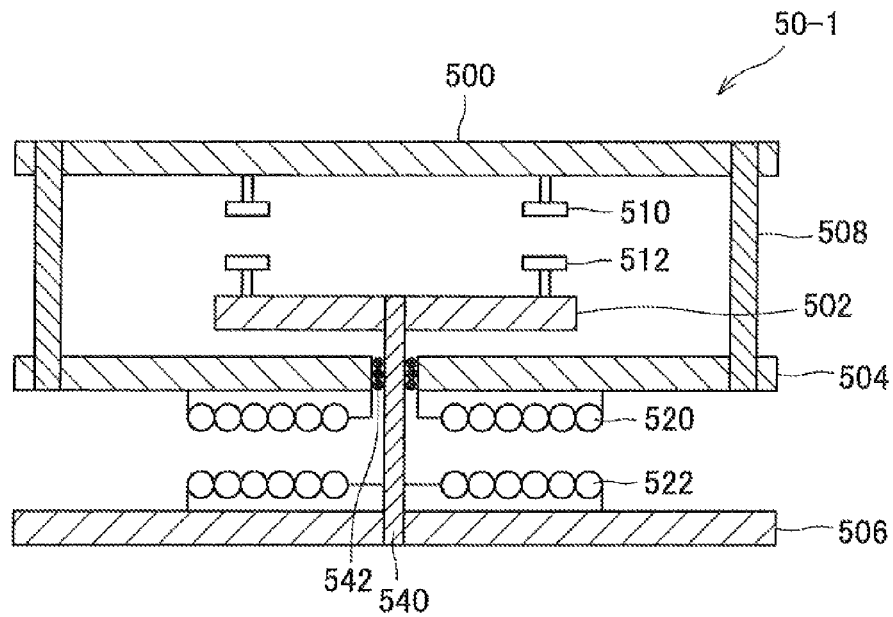
FIG. 12 is a cross-sectional diagram illustrating a configuration of Modification 1 of the antenna module according to the second embodiment.

Firstly, an antenna module 50-1 in Modification 1 will be described with reference to FIG. 12. As illustrated in FIG. 12, the antenna module 50-1 in Modification 1 includes, like the antenna module 50 described by using FIG. 11, the first dielectric substrate 500, the first proximity radio communication antenna 510, the first non-contact power transmission coil 520, the second dielectric substrate 502, the second proximity radio communication antenna 512, the second non-contact power transmission coil 522, the rotary shaft 540, and the bearing 542, and further includes a third dielectric substrate 504, a fourth dielectric substrate 506, and a spacer 508. Here, the third dielectric substrate 504 and the fourth dielectric substrate 506 are each made of a dielectric, like the first dielectric substrate 500 and the second dielectric substrate 502. The spacer 508 is a structure whose material or the like is not restricted.

The antenna module 50-1 in Modification 1 is different from the antenna module 50 described by using FIG. 11 in that the first proximity radio communication antenna 510, the first non-contact power transmission coil 520, the second proximity radio communication antenna 512, and the second non-contact power transmission coil 522 are formed on respective different planes.

Specifically, the spacer 508 connects the first dielectric substrate 500 and the third dielectric substrate 504. The first proximity radio communication antenna 510 is formed on the first dielectric substrate 500, and the first non-contact power transmission coil 520 is formed on the third dielectric substrate 504. The rotary shaft 540 connects the second dielectric substrate 502 and the fourth dielectric substrate 506. The second proximity radio communication antenna 512 is formed on the second dielectric substrate 502, and the second non-contact power transmission coil 522 is formed on the fourth dielectric substrate 506.

In addition, the bearing 542 is provided between the third dielectric substrate 504 and the rotary shaft 540. Thus, with respect to a side including the first proximity radio communication antenna 510 and the first non-contact power transmission coil 520, a side including the second proximity radio communication antenna 512 and the second non-contact power transmission coil 522 can rotate infinitely while the proximity radio communication and the non-contact power transmission are performed.

(2.4.2. Modification 2)

Figure 13:
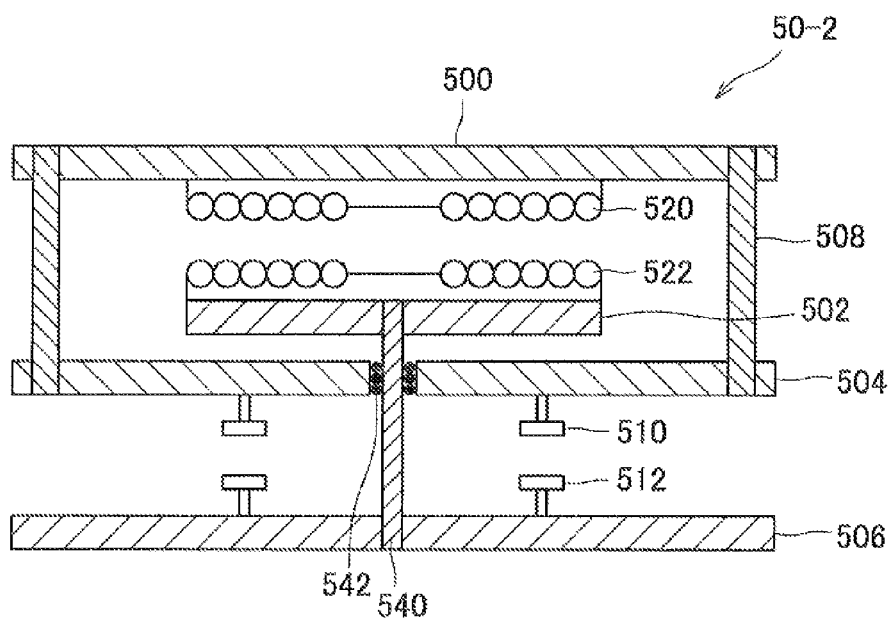
FIG. 13 is a cross-sectional diagram illustrating a configuration of Modification 2 of the antenna module according to the second embodiment.

Next, an antenna module 50-2 in Modification 2 will be described with reference to FIG. 13. As illustrated in FIG. 13, the antenna module 50-2 in Modification 2 has a configuration in which the positions of proximity radio communication antennas and non-contact power transmission coils are reversed as compared with the antenna module 50-1 in Modification 1. Since the details of the components are substantially the same as the content of the description of Modification 1, a description thereof is omitted herein. A structure of the antenna module 50-2 in Modification 2 also enables the infinite rotation while performing the proximity radio communication and the non-contact power transmission, like the antenna module 50-1 in Modification 1.

(2.4.3. Modification 3)

Figure 14:
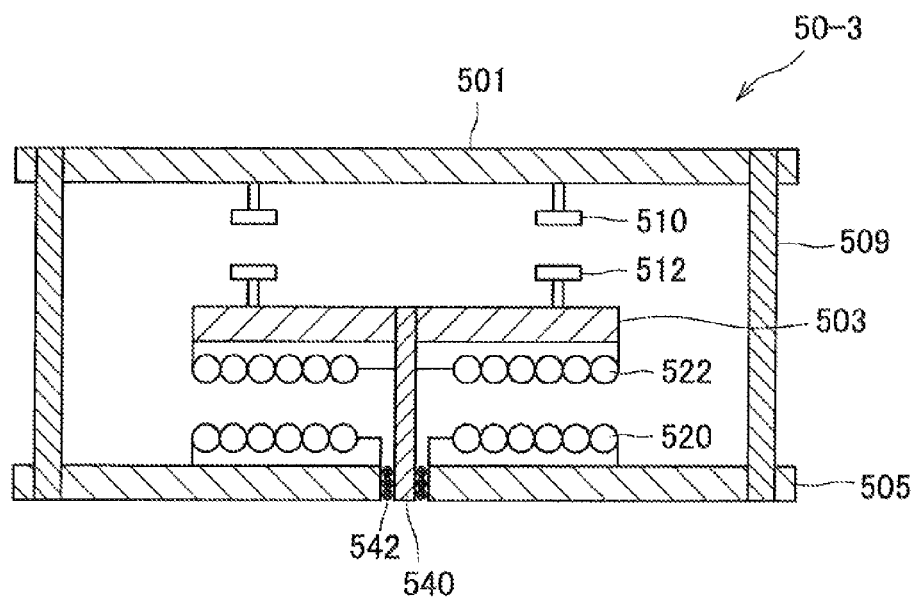
FIG. 14 is a cross-sectional diagram illustrating a configuration of Modification 3 of the antenna module according to the second embodiment.

Subsequently, an antenna module 50-3 in Modification 3 will be described with reference to FIG. 14. As illustrated in FIG. 14, the antenna module 50-3 in Modification 3 includes a first dielectric substrate 501, the first proximity radio communication antenna 510, the first non-contact power transmission coil 520, a second dielectric substrate 503, the second proximity radio communication antenna 512, the second non-contact power transmission coil 522, the rotary shaft 540, the bearing 542, a third dielectric substrate 505, and a spacer 509.

Also in the antenna module 50-3 in Modification 3, the first proximity radio communication antenna 510, the first non-contact power transmission coil 520, the second proximity radio communication antenna 512, and the second non-contact power transmission coil 522 are formed on respective different planes. Specifically, the spacer 509 connects the first dielectric substrate 501 and the third dielectric substrate 505. The first proximity radio communication antenna 510 is formed on the first dielectric substrate 501, and the first non-contact power transmission coil 520 is formed on the third dielectric substrate 505. The second proximity radio communication antenna 512 is formed on one surface of the second dielectric substrate 503 connected to the rotary shaft 540, and the second non-contact power transmission coil 522 is formed on the other surface opposite from the one surface.

In addition, the bearing 542 is provided between the third dielectric substrate 505 and the rotary shaft 540. Thus, with respect to a side including the first proximity radio communication antenna 510 and the first non-contact power transmission coil 520, a side including the second proximity radio communication antenna 512 and the second non-contact power transmission coil 522 can be infinitely rotated while the proximity radio communication and the non-contact power transmission are performed. Since the number of the dielectric substrates can be decreased by one in the antenna module 50-3 in Modification 3 in comparison with the antenna modules 50-1 and 50-2 in Modifications 1 and 2, the structure can be simplified.

(2.4.4. Modification 4)

Figure 15:
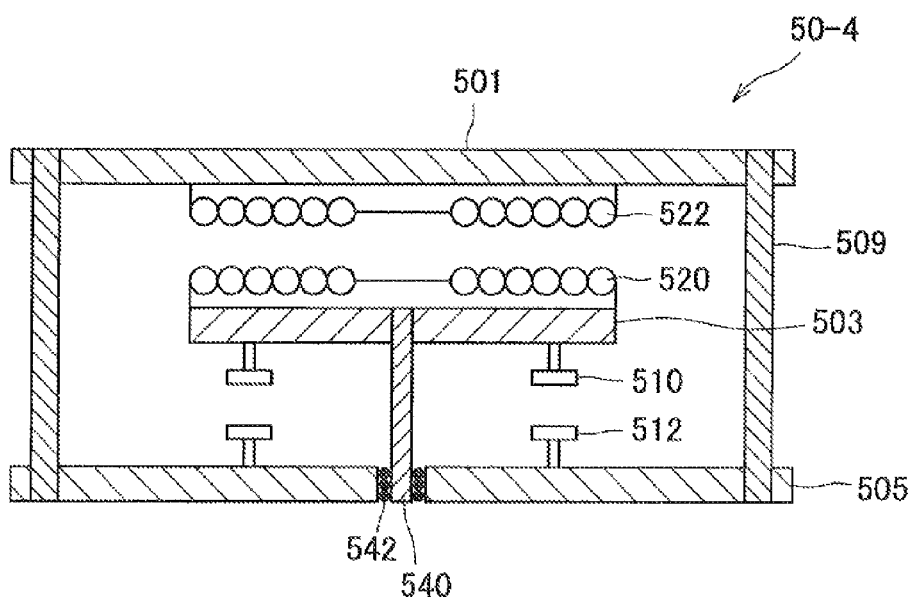
FIG. 15 is a cross-sectional diagram illustrating a configuration of Modification 4 of the antenna module according to the second embodiment.

Next, an antenna module 50-4 in Modification 4 will be described with reference to FIG. 15. As illustrated in FIG. 15, the antenna module 50-4 in Modification 4 has a configuration in which the positions of proximity radio communication antennas and non-contact power transmission coils are reversed as compared to the antenna module 50-3 in Modification 3. Since the details of the components are substantially the same as the content of the description of Modification 3, a description thereof is omitted herein. A structure of the antenna module 50-4 in Modification 4 also enables the infinite rotation while performing the proximity radio communication and the non-contact power transmission, like the antenna module 50-3 in Modification 3.

(2.4.5. Summary of Modifications 1 to 4)

In each of the antenna modules 50-1 to 50-4 in Modifications 1 to 4 described above, the first proximity radio communication antenna 510, the first non-contact power transmission coil 520, the second proximity radio communication antenna 512, and the second non-contact power transmission coil 522 are formed on the respective different planes. Such a configuration can lead to less interference caused by the proximity radio communication and the non-contact power transmission than in the antenna module 50 in which the first proximity radio communication antenna 510 and the first non-contact power transmission coil 520 are formed on the same plane and in which the second proximity radio communication antenna 512 and the second non-contact power transmission coil 522 are formed on the same plane. Moreover, the antenna modules 50-1 to 50-4 in Modifications 1 to 4 allow the components to be arranged in an overlapping manner in an axial direction of the rotary shaft, and thus can have a shorter width than the antenna module 50, so that a more compact antenna module can be achieved.

Note that Modifications 1 to 4 described above exemplify the structures of the antenna modules 50-1 to 50-4, but the embodiment of the technology according to the present disclosure is not limited to the examples. For example, in Modification 1, the rotary shaft 540 may be extended to connect with the first dielectric substrate 500, with the bearing 542 placed in between. Modifications can be appropriately made to the structures of the dielectric substrates 500, 502, 504, and 506, the spacer 508, the rotary shaft 540, and the like, within the technical scope of the present disclosure.

(2.4.6. Modification 5)

Figure 16:
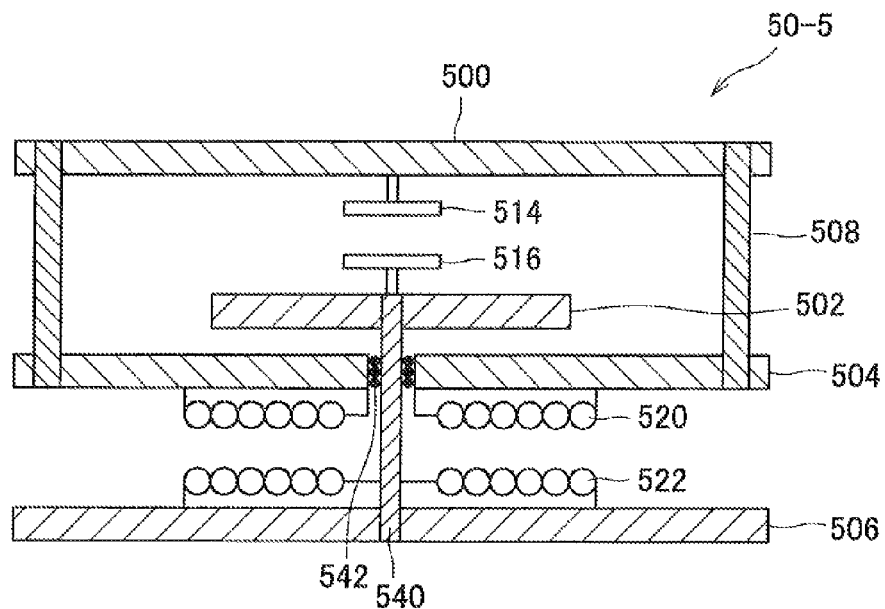
FIG. 16 is a cross-sectional diagram illustrating a configuration of Modification 5 of the antenna module according to the second embodiment.

Next, an antenna module 50-5 in Modification 5 will be described with reference to FIG. 16. As illustrated in FIG. 16, the antenna module 50-5 in Modification 5 exemplifies application of a first proximity radio communication antenna 514 and a second proximity radio communication antenna 516 which have a non-ring shape, instead of the first proximity radio communication antenna 510 and the second proximity radio communication antenna 512 which have the ring shape in the antenna module 50-1 in Modification 1. Since the configuration except the first proximity radio communication antenna 514 and the second proximity radio communication antenna 516 which have the non-ring shape is the same as that described in Modification 1, a description thereof is omitted herein.

That is, Modification 5 shows that a proximity radio communication antenna having the non-ring shape is also usable when the first proximity radio communication antenna 514 and the second proximity radio communication antenna 516 are arranged in the axial direction of the rotary shaft 540. However, it goes without saying that also in Modification 5, the first proximity radio communication antenna 514, the first non-contact power transmission coil 520, the second proximity radio communication antenna 516, and the second non-contact power transmission coil 522 are coaxially formed.

In addition, also in Modification 3, the first proximity radio communication antenna 514 and the second proximity radio communication antenna 516 which have the non-ring shape can be used, instead of the first proximity radio communication antenna 510 and the second proximity radio communication antenna 512 which have the ring shape.

(2.4.7. Modification 6)

Figure 17:
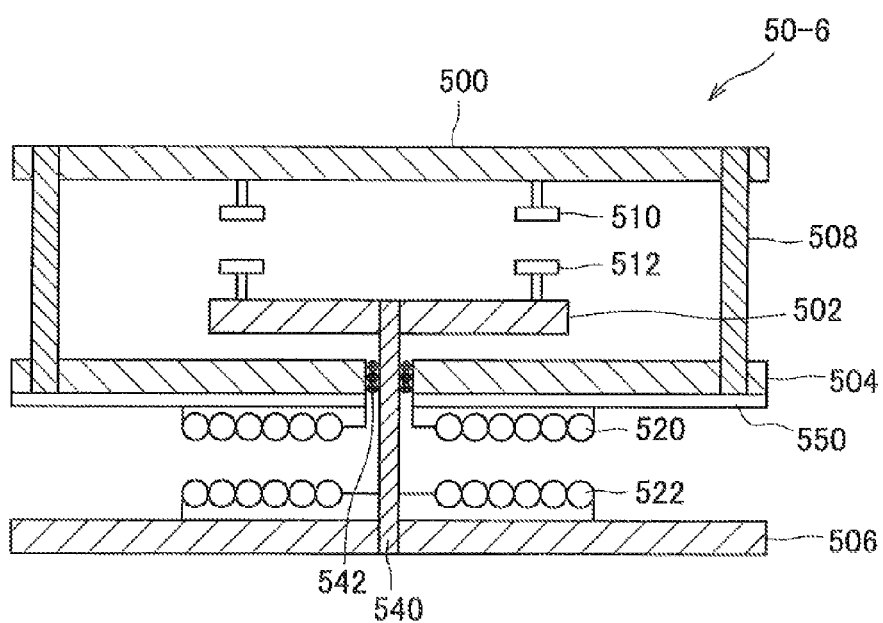
FIG. 17 is a cross-sectional diagram illustrating a configuration of Modification 6 of the antenna module according to the second embodiment.

Subsequently, an antenna module 50-6 in Modification 6 will be described with reference to FIG. 17. As illustrated in FIG. 17, the antenna module 50-6 in Modification 6 is different from the antenna module 50 in Modification 1 only in that a magnetic material sheet 550 is further provided on the third dielectric substrate 504. Since the configuration except the magnetic material sheet 550 is the same as that described in Modification 1, a description thereof is omitted herein.

The magnetic material sheet 550 is, for example, a sheet formed by mixing a metal which is a magnetic material with polymers, and absorbs magnetic fields due to its high magnetic permeability. When the magnetic material sheet 550 is provided on the third dielectric substrate 504, the magnetic material sheet 550 thereby absorbs the magnetic fields generated by the proximity radio communication antennas and the non-contact power transmission coils and can reduce the interference between the magnetic fields.

Note that Modification 6 shows the example in which the antenna module 50 in Modification 1 further includes the magnetic material sheet 550, but the modification of the present disclosure is not limited to the example. For example, in Modifications 2 and 5, the magnetic material sheet 550 may be provided at the same position to obtain the same effect.

(2.4.8. Modification 7)

Next, an antenna module 50-7 in Modification 7 will be described with reference to FIG. 18. As illustrated in FIG. 18, the antenna module 50-7 according to Modification 7 includes the first dielectric substrate 500, a non-annular first proximity radio communication antenna 518, the first non-contact power transmission coil 520, the second dielectric substrate 502, the second proximity radio communication antenna 512, and the second non-contact power transmission coil 522. However, the rotary shaft and the bearing are omitted in FIG. 18 for simplicity.

Here, a detailed description of the first dielectric substrate 500, the first non-contact power transmission coil 520, the second dielectric substrate 502, the second proximity radio communication antenna 512, and the second non-contact power transmission coil 522 is omitted which have substantially the same configuration as that described with reference to FIG. 11. A description is given below of the non-annular first proximity radio communication antenna 518 characteristic of Modification 7.

The non-annular first proximity radio communication antenna 518 is formed at a position away from the center of the first non-contact power transmission coil 520 by a distance equal to a radius d of the second proximity radio communication antenna 512. With such a configuration, even if the first dielectric substrate 500 rotates with respect to the second dielectric substrate 502, the non-annular first proximity radio communication antenna 518 is present at all times above the second proximity radio communication antenna 512. Thus, even during the rotation, the proximity radio communication can be performed between the non-annular first proximity radio communication antenna 518 and the second proximity radio communication antenna 512.

Here, an arc shape coaxial with the first non-contact power transmission coil 520 is exemplified in FIG. 18 as a specific shape of the non-annular first proximity radio communication antenna 518, but the embodiment of the technology of the present disclosure is not limited to the embodiment. The non-annular first proximity radio communication antenna 518 only has to have the non-annular shape, and may have any of various shapes such as a polygonal shape. Moreover, a plurality of non-annular first proximity radio communication antennas 518 may be arranged.

Employing the non-annular first proximity radio communication antenna 518 makes it possible to downsize the first dielectric substrate 500 in comparison with the case of the ring shape. Thus, the first dielectric substrate 500 including the antenna module 50-7 according to Modification 7 can also be downsized.

It goes without saying that the configuration of the antenna module 50-7 in Modification 7 can be combined with any of the aforementioned configurations in Modifications 1 to 4 and 6. Moreover, in the antenna module according to the first embodiment of the present disclosure, one of the two antenna modules 20 which perform the proximity radio communication and the non-contact power transmission with each other can have substantially the same configuration in Modification 7 described above including the first dielectric substrate 500. In such a case, the antenna module 20 has the non-annular proximity radio communication antenna. The embodiment is also included in the technical scope of the technology of the present disclosure.

3. Summarization

As described above, according to the first embodiment, coaxially providing the proximity radio communication antenna and the non-contact power transmission coil makes it possible to use both the proximity radio communication and the non-contact power transmission even if the direction of the antenna module on the transmission or reception side is rotated. Moreover, aligning only the center positions of the non-contact power transmission coils makes it possible to perform the proximity radio communication and the non-contact power transmission regardless of the angle of the antenna module. Thus, it is possible to enhance the degree of freedom in antenna module alignment by the user.

Further, according to the second embodiment, providing the rotary shaft in the axial center of the proximity radio communication antenna and the non-contact power transmission coil makes it possible to achieve a mechanism configured to perform the data communication and the power transmission in the non-contact manner and capable of infinitely rotating. The rotary mechanism achieved in the second embodiment does not have the metal contact, and thus can achieve a long life and high reliability.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An antenna module including:
a non-contact power transmission coil; and
a proximity radio communication antenna formed coaxially with the non-contact power transmission coil.

(2) The antenna module according to (1),
wherein the proximity radio communication antenna includes a coupler configured to perform electromagnetic field coupling.

(3) The antenna module according to (2),
wherein the coupler has a ring shape or a polygonal annular shape.

(4) The antenna module according to (3),
wherein the coupler receives power from a feedline in an identical phase at a plurality of points arranged at intersections of a line passing through a center of the ring shape or the polygonal annular shape with the coupler.

(5) The antenna module according to any one of (2) to (4),
wherein the coupler has at least one slit.

(6) The antenna module according to any one of (2) to (5),
wherein the coupler is formed on an outer peripheral side of the non-contact power transmission coil.

(7) The antenna module according to any one of (1) to (6),
wherein the proximity radio communication antenna includes a first proximity radio communication antenna and a second proximity radio communication antenna, and
wherein the non-contact power transmission coil includes a first non-contact power transmission coil and a second non-contact power transmission coil.

(8) The antenna module according to (7), further including:
a rotary shaft formed in an axial center of the non-contact power transmission coil and the proximity radio communication antenna.

(9) The antenna module according to (8),
wherein the rotary shaft is a non-metal.

(10) The antenna module according to any one of (7) to (9),
wherein the first proximity radio communication antenna and the first non-contact power transmission coil are formed on an identical plane, and the second proximity radio communication antenna and the second non-contact power transmission coil are formed on an identical plane.

(11) The antenna module according to any one of (7) to (9),
wherein the first proximity radio communication antenna, the first non-contact power transmission coil, the second proximity radio communication antenna, and the second non-contact power transmission coil are formed on respective different planes.

(12) The antenna module according to (11), further including:
a magnetic material sheet between: the first proximity radio communication antenna and the second proximity radio communication antenna; and the first non-contact power transmission coil and the second non-contact power transmission coil.

(13) The antenna module according to any one of (7) to (12),
wherein the first proximity radio communication antenna includes a coupler having a ring shape or a polygonal annular shape, and the second proximity radio communication antenna is formed to have at least one non-annular shape at a position away from the rotary shaft by a radius of the coupler.

(14) An information communication device including:
a non-contact power transmission coil;
a proximity radio communication antenna formed coaxially with the non-contact power transmission coil;
a power transmission control unit configured to control power transmission to the non-contact power transmission coil; and
a communication control unit configured to control a signal to the proximity radio communication antenna.

(15) The information communication device according to (14), further including:
a timing control unit configured to control timing in a manner that non-contact power transmission and proximity radio communication are performed simultaneously or in a time division manner.

(16) An information communication system including:
a first information communication device; and
a second information communication device,
the first information communication device including
a first non-contact power transmission coil,
a first proximity radio communication antenna formed coaxially with the first non-contact power transmission coil,
a power transmission control unit configured to control power feed to the first non-contact power transmission coil, and
a first communication control unit configured to control communication with the first proximity radio communication antenna,
the second information communication device including
a second non-contact power transmission coil corresponding to the first non-contact power transmission coil,
a second proximity radio communication antenna formed coaxially with the second non-contact power transmission coil and corresponding to the first proximity radio communication antenna,
a power reception control unit configured to control power reception from the second non-contact power transmission coil, and
a second communication control unit configured to control communication with the second proximity radio communication antenna.

What is claimed is:
1. An antenna module, comprising:
a non-contact power transmission coil; and
a proximity radio communication antenna including a coupler,
wherein the coupler is configured to receive power from a feedline to a plurality of connection points in an identical phase,
wherein the plurality of connection points are arranged on the coupler at a plurality of intersection points of a line with the coupler,
wherein the line passes through a center of the coupler, and
wherein the proximity radio communication antenna is coaxial with the non-contact power transmission coil.

2. The antenna module according to claim 1,
wherein the coupler is further configured to generate electromagnetic field coupling.

3. The antenna module according to claim 1,
wherein the coupler is one of ring-shaped or polygonal-shaped.

4. The antenna module according to claim 1,
wherein the coupler has at least one slit.

5. The antenna module according to claim 1,
wherein the coupler is on one of an outer peripheral side or an inner peripheral side of the non-contact power transmission coil.

6. The antenna module according to claim 1,
wherein the proximity radio communication antenna includes a first proximity radio communication antenna and a second proximity radio communication antenna, and
wherein the non-contact power transmission coil includes a first non-contact power transmission coil and a second non-contact power transmission coil.

7. The antenna module according to claim 6, further comprising
a rotary shaft in an axial center of the non-contact power transmission coil and the proximity radio communication antenna.

8. The antenna module according to claim 7,
wherein the rotary shaft comprises a non-metal that reduces an influence of eddy currents due to an electromagnetic induction by a magnetic field in at least one of the non-contact power transmission coil or the proximity radio communication antenna.

9. The antenna module according to claim 7,
wherein the first proximity radio communication antenna and the first non-contact power transmission coil are in a plane of a first dielectric substrate, and
wherein the second proximity radio communication antenna and the second non-contact power transmission coil are in a plane of a second dielectric substrate.

10. The antenna module according to claim 9,
wherein the plane of the first dielectric substrate faces the plane of the second dielectric substrate.

11. The antenna module according to claim 7,
wherein the first proximity radio communication antenna, the first non-contact power transmission coil, the second proximity radio communication antenna, and the second non-contact power transmission coil are in respective planes of different dielectric substrates.

12. The antenna module according to claim 11, further comprising
a magnetic material sheet between at least one of the first proximity radio communication antenna and the second proximity radio communication antenna, or the first non-contact power transmission coil and the second non-contact power transmission coil.

13. The antenna module according to claim 7,
wherein the first proximity radio communication antenna includes the coupler, wherein the coupler is one of ring shaped or polygonal shaped, and wherein the second proximity radio communication antenna is non-annular shaped at a position away from the rotary shaft by a radius of the coupler.

14. The antenna module according to claim 1, wherein the feedline is connected to the coupler by at least one columnar conductor.

15. The antenna module according to claim 1, wherein a length of the feedline corresponds to a multiple of one-fourth of a communication frequency wavelength.

16. The antenna module according to claim 15, wherein a band of proximity radio communication is controlled based on the length of the feedline.

* * * * *